United States Patent
Ahn et al.

(10) Patent No.: US 11,540,308 B2
(45) Date of Patent: Dec. 27, 2022

(54) APPARATUS AND METHOD FOR SCHEDULING IN WIRELESS COMMUNICATION SYSTEM USING SLIDING WINDOW SUPERPOSITION CODING SCHEME

(71) Applicants: Samsung Electronics Co., Ltd., Suwon-si (KR); The Regents of The University of California, Oakland, CA (US)

(72) Inventors: Seokki Ahn, Suwon-si (KR); Kwangtaik Kim, Suwon-si (KR); Young-Han Kim, San Diego, CA (US)

(73) Assignees: Samsung Electronics Co., Ltd., Suwon-si (KR); The Regents of The University of California, Oakland, CA (US)

( * ) Notice: Subject to any disclaimer, the term of this patent is extended or adjusted under 35 U.S.C. 154(b) by 129 days.

(21) Appl. No.: 15/733,203

(22) PCT Filed: Nov. 28, 2018

(86) PCT No.: PCT/KR2018/014778
§ 371 (c)(1),
(2) Date: Jun. 9, 2020

(87) PCT Pub. No.: WO2019/117508
PCT Pub. Date: Jun. 20, 2019

(65) Prior Publication Data
US 2021/0105806 A1 Apr. 8, 2021

(30) Foreign Application Priority Data
Dec. 11, 2017 (KR) .......................... 10-2017-0169563

(51) Int. Cl.
*H04L 1/18* (2006.01)
*H04W 28/22* (2009.01)
(Continued)

(52) U.S. Cl.
CPC ....... *H04W 72/1278* (2013.01); *H04L 1/0003* (2013.01); *H04L 1/1832* (2013.01); *H04W 28/22* (2013.01); *H04W 72/042* (2013.01)

(58) Field of Classification Search
None
See application file for complete search history.

(56) References Cited

U.S. PATENT DOCUMENTS

2007/0298718 A1   12/2007   Je et al.
2010/0232534 A1   9/2010   Lee et al.
(Continued)

FOREIGN PATENT DOCUMENTS

KR   10-2007-0122044 A   12/2007
KR   10-2009-0025034 A   3/2009
(Continued)

OTHER PUBLICATIONS

International Search Report and Written Opinion of the International Searching Authority in connection with International Application No. PCT/KR2018/014778 dated Mar. 8, 2019, 9 pages.
(Continued)

*Primary Examiner* — The Hy Nguyen

(57) ABSTRACT

The present disclosure relates to a method and apparatus for transmitting and receiving data in a wireless communication system. In particular, the present disclosure relates to a scheduling method and apparatus for transmitting and receiving data in a wireless communication system using a sliding window superposition coding scheme. In the present disclosure, in a wireless communication system, if a UE is located in a cell edge, data throughput can be improved. An
(Continued)

eNB using an SWSC scheme can provide fast scheduling. An eNB can provide higher throughput.

14 Claims, 18 Drawing Sheets

(51) Int. Cl.
*H04W 72/12* (2009.01)
*H04L 1/00* (2006.01)
*H04W 72/04* (2009.01)

(56) References Cited

U.S. PATENT DOCUMENTS

| | | |
|---|---|---|
| 2013/0156139 A1 | 6/2013 | Lee et al. |
| 2013/0157678 A1* | 6/2013 | Kim .................. H04W 72/048 455/452.1 |
| 2016/0285656 A1* | 9/2016 | Kim ........................ H04L 25/06 |
| 2017/0163392 A1* | 6/2017 | Lim ....................... H04L 5/0032 |
| 2017/0214502 A1* | 7/2017 | Kim ....................... H04L 1/0009 |
| 2020/0008208 A1* | 1/2020 | Kim ........................ H04B 7/024 |
| 2020/0145985 A1* | 5/2020 | Ku ......................... H04L 1/0026 |

FOREIGN PATENT DOCUMENTS

| | | |
|---|---|---|
| KR | 10-1272312 B1 | 6/2013 |
| KR | 10-2016-0115556 A | 10/2016 |

OTHER PUBLICATIONS

Kwang Taik Kim, et al., "Interference Management via Sliding-Window Coded Modulation for 5G Cellular Networks," IEEE Communications Magazine, vol. 54, Issue 11, Nov. 15, 2016, 9 pages.

* cited by examiner

FIG. 2C

| block j | 1 | 2 | 3 | ... | b-1 | b |
|---|---|---|---|---|---|---|
| U | 1 | $m_{11}$ | | | | |
| V | $m_{11}$ | $m_{12}$ | $m_{12}$ | ... | $m_{1,b-1}$ | 1 |
| $X_1 = f(U,V)$ | | | | | | |
| $X_2$ | $m_{21}$ | $m_{22}$ | 3 | ... | $m_{2,b-1}$ | $m_{2b}$ |
| $Y_1$ | ∅ | $\hat{m}_{11}$ | $\hat{m}_{12}$ | ... | $\hat{m}_{2,b-1}$ | $\hat{m}_{1,b-1}$ |
| | | $\hat{m}_{22}$ | | | | $\hat{m}_{2b}$ |
| $Y_2$ | ∅ | $\hat{m}_{11}$ | $\hat{m}_{12}$ | ... | $\hat{m}_{2,b-1}$ | $\hat{m}_{1,b-1}, \hat{m}_{2,b-1}$ |
| | ∅ | $\hat{m}_{21}$ | $\hat{m}_{22}$ | | | |

251, 261, 252, 262

APPARATUS AND METHOD FOR SCHEDULING IN WIRELESS COMMUNICATION SYSTEM USING SLIDING WINDOW SUPERPOSITION CODING SCHEME

CROSS-REFERENCE TO RELATED APPLICATIONS

This application is a 371 National Stage of International Application No. PCT/KR2018/014778, filed Nov. 28, 2018, which claims priority to Korean Patent Application No. 10-2017-0169563, filed Dec. 11, 2017, the disclosures of which are herein incorporated by reference in their entirety.

BACKGROUND

1. Field

The present disclosure relates to a method and apparatus for transmitting and receiving data in a wireless communication system and, more particularly, to a scheduling method and apparatus for transmitting and receiving data in a wireless communication system using a sliding window superposition coding scheme.

2. Description of Related Art

After the commercialization of the 4G communication system, efforts to develop an improved 5G communication system or pre-5G communication system are being made to meet an increasing wireless data traffic demand. For this reason, the 5G communication system or pre-5G communication system is called a beyond 4G network communication system or a post LTE system.

In order to achieve a high data transfer rate, an implementation of the 5G communication system in an ultrahigh frequency (mmWave) band (e.g., such as a 60 GHz band) is taken into consideration. In order to reduce a path loss of a radio wave and increase the transfer distance of a radio wave in the ultrahigh frequency band, in the 5G communication system, technologies, such as beamforming, massive MIMO, full dimensional MIMO (FD-MIMO), an array antenna, analog beamforming and a large scale antenna, are being discussed.

Furthermore, in order to improve the network of a system, in the 5G communication system, technologies, such as an evolved small cell, an advanced small cell, a cloud radio access network (cloud RAN), an ultra-dense network, device to device communication (D2D), a wireless backhaul, a moving network, cooperative communication, coordinated multi-points (CoMP) and received interference cancellation, are being developed.

In addition, in the 5G system, hybrid FSK and QAM modulation (FQAM) and sliding window superposition coding (SWSC), that is, advanced coding modulation (ACM) schemes, and a filter bank multi-carrier (FBMC), non-orthogonal multiple access (NOMA) and sparse code multiple access (SCMA), that is, advanced access technologies, are being developed.

In a cellular environment, a user equipment (UE) may have a reduction in reception performance of a signal due to interference from a neighbor cell. In particular, if a UE is located in a cell edge, in particular, reception performance may be deteriorated. In such an interference environment scenario, a sliding window superposition coding (SWSC) scheme has emerged in such a way as to achieve performance of a theoretical threshold in the physical layer.

The SWSC scheme is a scheme for maximizing system throughput in a multi-cell environment. In particular, in the 5G network, many shadow areas may occur due to the use of a high frequency band if only one eNB that covers a wide area, such as the existing 4G network, is deployed. Accordingly, the 5G network adopts a form having a small communication area using a plurality of transmission and reception points (TPs) within the range of one eNB. In this case, several methods have been proposed as methods for one eNB to manage TPs. In the 5G network having an eNB using TPs as described above, UEs may be very frequently located in a cell edge compared to the existing 4G network. Furthermore, even in the 4G network, various methods, such as a CoMP network, are present in a form similar to the 5G network.

If the SWSC scheme is used, throughput of a UE can be improved, but a heavy load is generated in the eNB. Data that requires fast processing may have a problem attributable to complexity for applying the SWSC scheme.

SUMMARY

The present disclosure provides a scheduling method and apparatus capable of enhancing data throughput if a UE is located in a cell edge in a wireless communication system.

Furthermore, the present disclosure provides a fast scheduling method and apparatus in an eNB using the SWSC scheme.

Furthermore, the present disclosure provides a scheduling method and apparatus in which an eNB can provide higher throughput if the SWSC scheme is used.

In a method according to an embodiment of the present disclosure, a scheduling method for data transmission and reception in a centralized device of a wireless communication system using a sliding window superposition coding (SWSC) method may include receiving all of pieces of interference information of user equipments (UEs) included in a plurality of cells from the cells; selecting a UE having the greatest sum of proportional fairness (sum PF) or the greatest sum of transfer rates in each of the cells; generating a dominant interference graph using dominant interference cell information using the selected UE; checking whether at least one connected cycle component group is present in the generated dominant interference graph; selecting one connected cycle component group if at least one connected cycle component group is present and selecting a specific one component cell from the selected connected cycle component group; determining the transfer rate of the selected component cell and the transfer rate of a component cell providing dominant interference to the selected component cell to be a specific transfer rate based on the transfer rate graph of the SWSC scheme and determining the transfer rate of the selected component cell based on the specific transfer rate; determining the transfer rate of a cell belonging to the connected cycle component cells and having an non-determined transfer rate based on the transfer rate of the selected component cell; correcting the transfer rate of the component cell providing dominant interference to the selected cell based on the determined transfer rate of the connected cycle component cells; determining the transfer rates of cells neighboring the connected cycle component cells; and providing corresponding cells with information about the determined transfer rates of the cells.

In an apparatus according to an embodiment of the present disclosure, a centralized device for scheduling a transfer rate to be transmitted from a plurality of cells using a sliding window superposition coding (SWSC) method to a UE located in each cell may include an interface configured to receive interference information of user equipments (UEs) included in corresponding cells from the cells and to provide scheduling information to each of the cells; memory configured to store a previous transfer rate provided to each of the cells and the interference information of the UEs received from the cells; and a controller configured to receive all of pieces of interference information of user equipments (UEs) included in a plurality of cells from the cells, select a UE having the greatest sum of proportional fairness (sum PF) or the greatest sum of transfer rates in each of the cells, generate a dominant interference graph using dominant interference cell information using the selected UE, check whether at least one connected cycle component group is present in the generated dominant interference graph, select one connected cycle component group if at least one connected cycle component group is present and selecting a specific one component cell from the selected connected cycle component group, determine the transfer rate of the selected component cell and the transfer rate of a component cell providing dominant interference to the selected component cell to be a specific transfer rate based on the transfer rate graph of the SWSC scheme, determine the transfer rate of the selected component cell based on the specific transfer rate, determine the transfer rate of a cell belonging to the connected cycle component cells and having an non-determined transfer rate based on the transfer rate of the selected component cell, correct the transfer rate of the component cell providing dominant interference to the selected cell based on the determined transfer rate of the connected cycle component cells, determine transfer rates of cells neighboring the connected cycle component cells, and provide corresponding cells with information about the determined transfer rates of the cells.

In accordance with the embodiments of the present disclosure, scheduling capable of providing a maximum transfer rate to a UE located in a cell edge can be performed based on a dominant interference graph. Furthermore, upon scheduling, complexity can be reduced and a scheduling time can be reduced.

BRIEF DESCRIPTION OF THE DRAWINGS

FIG. 2C is an exemplary diagram for illustrating message processing from the point of view that a transmitted symbol is received and processed in a communication system using the SWSC scheme according to an embodiment of the present disclosure.

DETAILED DESCRIPTION

Figure 1:
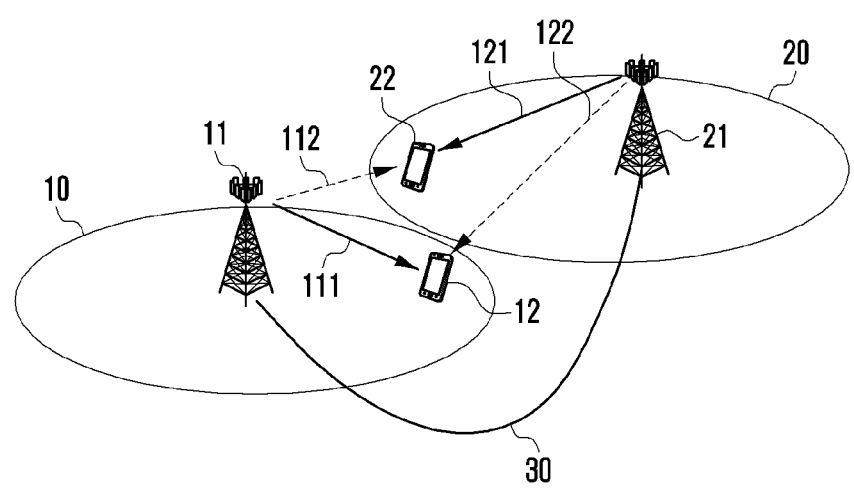
FIG. 1 is a conceptual exemplary diagram for illustrating an interference environment of a UE from a neighbor cell according to the present disclosure.

Hereinafter, various embodiments are described in detail with reference to the accompanying drawings. It is to be noted that the same reference numerals are used throughout the drawings to refer to the same elements. Furthermore, it is to be noted that the accompanying drawings of the present disclosure are provided to help understanding of the present disclosure and the present disclosure is not limited to a form or arrangement illustrated in the drawings of the present disclosure. Furthermore, a detailed description of the known functions or elements that may make the gist of the present invention vague is omitted. It is to be noted that in the following description, only parts necessary to understand operations according to various embodiments of the present invention are described and a description of other parts is omitted in order to prevent the gist of the present invention from becoming vague.

Prior to a description of the present disclosure, an SWSC coding and decoding operation is described below.

FIG. 1 is a conceptual exemplary diagram for illustrating an interference environment of a UE from a neighbor cell according to the present disclosure.

Referring to FIG. 1, a first eNB 11 and a second eNB 21 have been illustrated. The first eNB 11 may communicate with a first UE 12 located within a first eNB communication area 10, and the second eNB 21 may communicate with a second UE 22 located within a second eNB communication area 20. In this case, the first eNB 11 and the second eNB 21 may be eNBs (NodeB or eNodeB) of a 4G system or may be eNBs of a 5G system. Furthermore, if the 5G system is assumed, the first eNB 11 and the second eNB 21 may be TPs controlled by one eNB of one 5G system. In the present disclosure, each eNB may have any form if it performs communication with a UE located in a cell edge according to the SWSC scheme.

The first UE 12 located in the first eNB 11 may receive a signal 111 from the first eNB 11. Furthermore, the first UE 12 also receives a signal 122 from the second eNB 21. In this case, from the point of view of the first UE 12, the signal 122 received from the second eNB 21 is an interference signal. Likewise, the second UE 22 located in the second eNB 21 may receive a signal 121 from the second eNB 21. Furthermore, the second UE 22 also receives a signal 112 from the first eNB 11. Accordingly, from the point of view of the second UE 22, the signal 112 received from the first eNB 11 is an interference signal.

If the SWSC scheme is used in such an environment, that is, in the environment in which UEs located in a cell edge receive interference signals from adjacent eNBs, a theoretical threshold in an AWGN interference channel modeled from an interference environment from a neighbor cell can be achieved.

The SWSC scheme according to the present disclosure is described below with reference to FIGS. 2A to 2C.

Figure 2A:
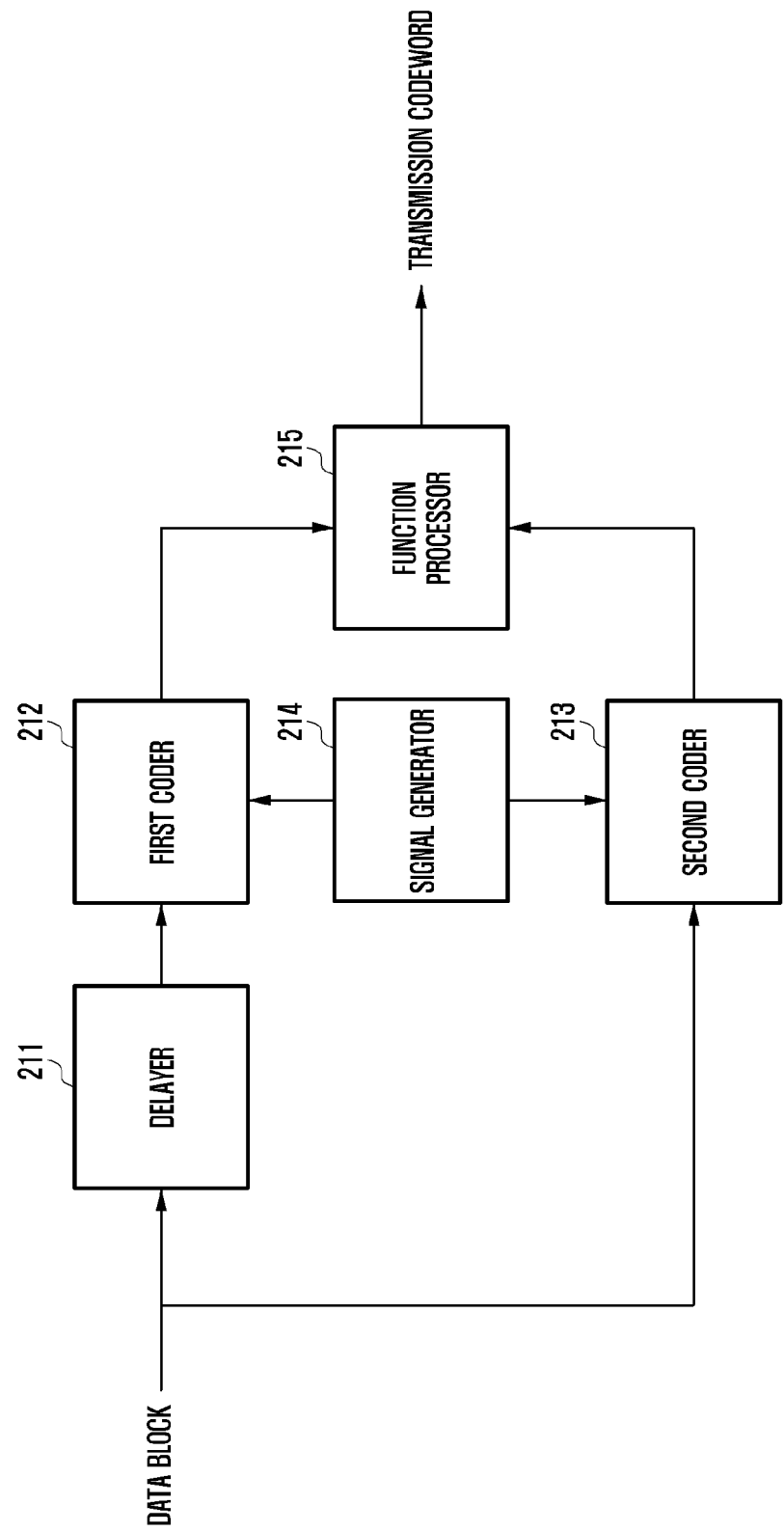
FIG. 2A is a functional block diagram of a transmission apparatus according to an SWSC coding scheme according to the present disclosure.

FIG. 2A is a functional block diagram of a transmission apparatus according to an SWSC coding scheme according to the present disclosure.

A data block to be transmitted may be a data block of a size to be transmitted by a transmission apparatus, for example, an eNB. In general, contiguous two data blocks may be transmitted in a single message form. The data blocks are sequentially processed by one block. The input one data block may be input to a second coder 213 and a delayer 211 at the same time. The second coder 213 may code the data to be transmitted based on a predetermined coding scheme and output the coded data. Accordingly, in the following description, an operation of processing one data block is described.

Furthermore, the delayer 211 may delay the data block input by a processing time in the second coder 213, and may output the delayed data block to a first coder 212. A signal generator 214 may be a device for generating a signal previously known to a transmission apparatus and a reception apparatus. Accordingly, the signal generator 214 may output a previously known signal to the first coder 212 and/or the second coder 213 at a specific point of time (this is further described with reference to the drawing to be described later). The first coder 212 and the second coder 213 code the respective input signals and output them to a function processor 215. In response thereto, the function processor 215 may output a codeword to be transmitted by applying a predetermined function (this is further described with reference to the drawing to be described later) to the codewords coded by the first coder 212 and the second coder 213.

The aforementioned operation is performed for each data block. When the processing of one data block is completed, a next data block may be processed through the same process. Furthermore, such an operation may be performed until a data block to be transmitted is no longer present or until all of scheduled data is transmitted.

Figure 2B:
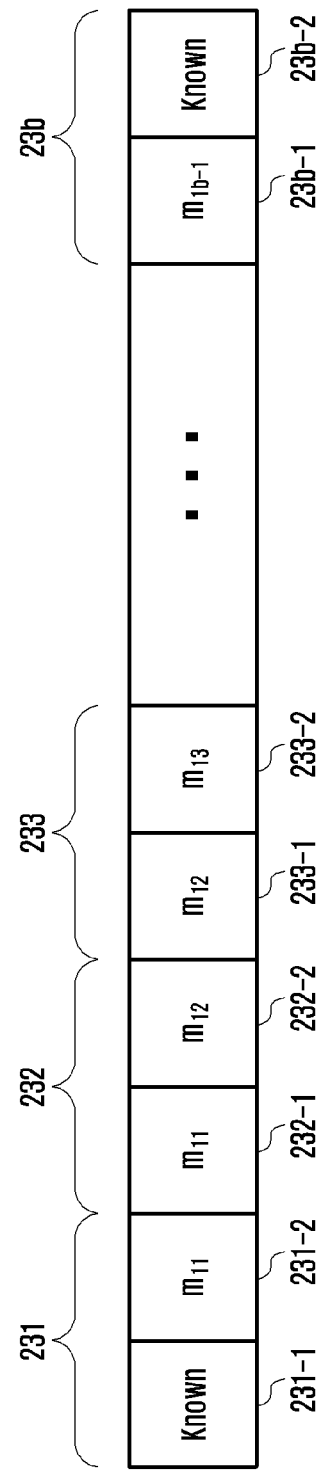
FIG. 2B is an exemplary diagram for illustrating codeword coded according to the SWSC coding scheme.

FIG. 2B is an exemplary diagram for illustrating codeword coded according to the SWSC coding scheme.

Referring to FIG. 2B, two codewords mab may be a message (or transport block) transmitted by an eNB. In the following description, two codewords may be described as being one message or one transport block. Furthermore, one codeword may be the aforementioned data block unit.

Two codewords forming a transport block have been assigned subscripts, such as "a" and "b", other than the first codeword and the last codeword. In each codeword, "1" that is a first subscript corresponding to "a" means data transmitted to a first UE, and a second subscript corresponding to "b" means the sequence of a transmitted data block. Referring to FIG. 2B based on such contents, actually transmitted messages 231, 232, 233, . . . , 23*b* may include codewords coded by the first coder 212 and the second coder 213. The actually transmitted messages 231, 232, 233, . . . , 23*b* are logically described below. The messages may be divided into codewords 231-1, 232-1, 233-1, . . . , 23*b*-1 coded by the first coder 212 and codewords 231-2, 232-2, 233-2, . . . , 23*b*-2 coded by the second coder 213.

Referring to FIGS. 2A and 2B, first, the first data block of data blocks to be transmitted is input to the second coder 213 and coded. Information known to both a transmission apparatus and a reception apparatus, for example, information of "1" or information of "0" may be input to the first coder 212. In this case, the coded codeword "Known" 231-1 output by the first coder 212 may be already known information, and coded codeword m11 231-2 output by the second coder 213 may be a codeword coded from the first data block. Accordingly, the function processor 215 may combine the codeword "Known" 231-1 coded as known data output by the first coder 212 and the codeword m11 231-2 coded from the first data block by the second coder 213 based on a predetermined function, and may output the results.

Thereafter, the first data block may be input to the first coder 212 through the delayer 211, and the second data block may be input to the second coder 213. Accordingly, the first coder 212 outputs the codeword m11 232-1 coded from the first data block, and the second coder 213 outputs the codeword m12 232-2 coded from the second data block. Accordingly, the function processor 215 may combine the codeword 232-1 coded from the first data block and output by the first coder 212 and the codeword 232-2 coded from the second data block and output by the second coder 213 based on a predetermined function, and may output the results.

Likewise, the second data block may be input to the first coder 212 through the delayer 211, and a third data block may be input to the second coder 213. Accordingly, the first coder 212 outputs the codeword m12 233-1 coded from the second data block, and the second coder 213 outputs the codeword m13 233-2 coded from the third data block. Accordingly, the function processor 215 may combine the codeword m12 233-1 coded from the second data block and output by the first coder 212 and the codeword m13 233-2 coded from the second data block and output by the second coder 213 based on a predetermined function, and may output the results.

If a b-th data block is transmitted after (b−1) data blocks are transmitted using such a method, the signal generator 214 may input aforementioned information known to both the transmission apparatus and the reception apparatus, for example, information of "1" or information of "0" to the second coder 213. Accordingly, the first coder 212 may output the codeword m1, b−1 23*b*-1 coded from the (b−1)-th data block, and the second coder 213 may output the codeword "Known" 23*b*-2 coded from the known data. Transmission symbols generated through such a process may be sequentially transmitted.

FIG. 2C is an exemplary diagram for illustrating message processing from the point of view that a transmitted symbol is received and processed in a communication system using the SWSC scheme according to an embodiment of the present disclosure.

It is assumed that as described above, the first eNB 11 transmits a message through two contiguous blocks without a split and the second eNB 21 transmits a message through point-to-point (p2p) code. In this case, each of the first UE 12 and the second UE 22 may restore all of the messages by repeatedly performing a method of decoding the messages one by one at once within two window blocks, sliding the decoding window to the right by one data block (i.e., block sliding) and then decoding the messages one by one at once up to the last data block. This is described in more detail below.

In the eNB, an SWSC transmission apparatus transmits one message through several data blocks and transmits the data blocks using a superposition coding method over several layers for such an operation. For example, it is assumed that the first eNB 11 generates a codeword X1 by the function processor 215 according to the SWSC scheme of a U codeword generated by the first coder 212 and a V codeword generated by the second coder 213. Furthermore, it is assumed that the second eNB generates a message in the form of a codeword X2 according to a p2p coding scheme and transmits the codeword.

In FIG. 2C, the first eNB 11 may generate codewords corresponding to the data blocks of U by the first coder 212 from the first data block to be transmitted to the b-th data block, and may generate codewords corresponding to the data blocks of V by the second coder 213. Furthermore, the generated codewords may be configured like one messages 231, 232, 233, . . . , 23b in accordance with corresponding transmission blocks as described above.

As assumed above, the second eNB 21 may generate a message of X2 using another method (e.g., in general, an existing method of transmitting data) other than the SWSC scheme as in reference numeral 261, and may transmit the message.

In this case, from the point of view of the first UE 12 that receives a message from the first eNB 11, the first UE 12 may receive messages from the first eNB 11 and the second eNB 21. In FIG. 2C, messages Y1 received from the first eNB 11 have been illustrated as being reference numeral 251, and messages Y2 received from the second eNB 21 have been illustrated as being reference numeral 262.

Specific data blocks to be transmitted from the first eNB 11 to the first UE 12 are transmitted twice through two messages. That is, as described above with reference to FIG. 2B, the output codeword of the second coder 213 within the first message 231 and the output codeword of the first coder 212 within the second message 232 may be actually the same data block. Accordingly, the first UE 12 of the reception apparatus may receive the two messages and perform decoding on the messages because the same messages are transmitted through two blocks. Furthermore, as described above, the first eNB 11 codes a data block, coded by the first coder 212 and known to both the transmission apparatus and the reception apparatus, into the first message transmitted to the first UE 12, and transmits the first message.

Accordingly, the first UE 12 may cancel information of the first coder 212 using the codeword 231-1 that belongs to the codewords received through the first message 231 and the second message 232 and that is based on the known information. Furthermore, the first UE 12 may treat the first block that belongs to the codewords received through the first message 231 and the second message 232 and that has been coded from the same information as noise, and may decode an interference signal received from the second eNB 21.

Thereafter, the first UE 12 may decode an actually desired first data block using the results of the cancellation of the information of the first coder 212 using the codeword 231-1 based on the known information in the first message 231 and the results of the decoding of the interference signal received from the second eNB 21. Accordingly, the first UE 12 may decode the first data block m11. Likewise, the first data block m11 restored through such a method may be restored by decoding the second data block m12 using the second message 232 and the third message 233 based on the known information. The first UE 12 may receive a desired message block using such a method.

In the aforementioned method, a theoretical threshold can be achieved in an AWGN interference channel modeled from an interference environment from a neighbor cell in the environment in which UEs located in a cell edge receive a signal from an adjacent eNB.

The same principle may be applied to the second UE 22 except that in the first UE 12, the signal received from the first eNB 11 is a desired signal and the signal received from the second eNB 21 is an interference signal, but in the second UE 22, the signal received from the second eNB 21 is a desired signal and the signal received from the first eNB 11 is an interference signal.

Accordingly, if the same method is used in the second eNB 21, the second UE 22 can restore desired data by cancelling interference from the first eNB 11 using the same method. As a result, both the first eNB 11 and the second eNB 21 can provide a data transfer rate close to a theoretical threshold to UEs located in the cell edge of their cells 10 and 20 by applying the SWSC scheme according to the present disclosure.

Figure 3:
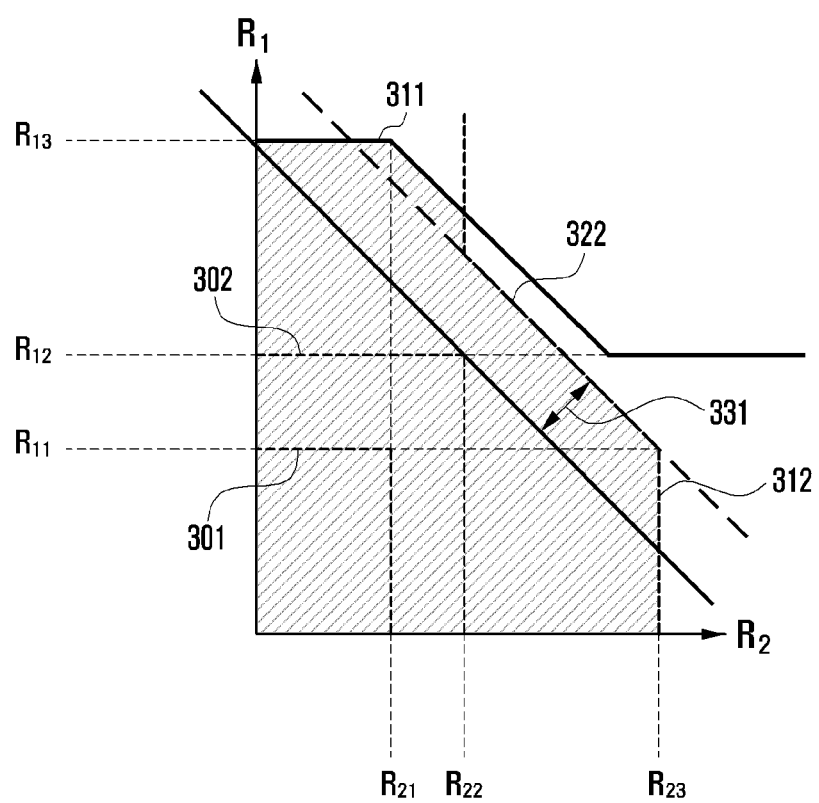
FIG. 3 is a diagram illustrating a graph of a transfer rate which may be achieved if the SWSC scheme according to the present disclosure is applied.

FIG. 3 is a diagram illustrating a graph of a transfer rate which may be achieved if the SWSC scheme according to the present disclosure is applied.

Referring to FIG. 3, a Y axis R1 means data throughput (transfer rate) of the first eNB 11, and an X axis R2 means data throughput (transfer rate) of the second eNB 21. Accordingly, if the first eNB 11 and the second eNB 21 include neighboring cells, they can operate only within the range in which the data throughput of the first eNB 11 and the second eNB 21 is satisfied. That is, adjacent two eNBs need to be taken into consideration with respect to the data transfer rate at which UEs located in a cell edge transmit data in an AWGN interference channel modeled from an interference environment from a neighbor cell in the environment in which the UEs receive a signal from an adjacent eNB.

FIG. 3 additionally illustrates the following two methods for a comparison with other methods in addition to the SWSC scheme according to the present disclosure. First, a range graph (it may be interchangeably used with an "RSCD graph" or "RSCD range.") based on an graph RSCD 301 may be a data transfer rate in a method for the UE 12 located in the cell edge of the first eNB 11 to cancel interference from the second eNB 21 by successfully decoding the interference (successive cancellation decoding (SCD)).

RSCD, that is, the graph 301, is described in more detail. From the point of view of the first eNB 11, processing up to data transfer rate of R11 is possible. From the point of view of the second eNB 21, processing up to a data transfer rate of R21 is possible. Accordingly, a maximum data transfer rate for a UE located in the cell edge of the first eNB 11 may be the data transfer rate of R11 when only the second cell is taken into consideration. Likewise, a maximum data transfer rate for a UE located in the cell edge of the second eNB 21 may be the data transfer rate of R21 when only the first cell is taken into consideration.

Furthermore, in the LTE network widely known as the current 4G system, an interference as noise (IAN) scheme of treating interference as noise is used. Accordingly, in the example of FIG. 3, a range graph (it may be interchangeably used with an "RIAN graph" or "RIAN range.") based on RIAN 302 has also be illustrated. The graph of RIAN 302 may be a data transfer rate in a method for the UE 12 located in the cell edge of the first eNB 11 to treat interference from the second eNB 21 as noise.

The graph RIAN, that is, the graph 302, is described in more detail. From the point of view of the first eNB 11, processing up to a data transfer rate of R12 is possible. From the point of view of the second eNB 21, processing up to a data transfer rate of R22 is possible. Accordingly, a maximum data transfer rate for a UE located in the cell edge of the first eNB 11 may be the data transfer rate of R12 when only the second cell is taken into consideration. Likewise, a maximum data transfer rate for a UE located in the cell edge of the second eNB 21 may be the data transfer rate of R22 when only the first cell is taken into consideration.

Finally, data transfer rates according to the SWSC scheme according to the present disclosure is described. In data transfer rates according to the SWSC scheme according to the present disclosure, graphs 311 and 312 are graphs of RSWSC.

311 denotes the graph of RSWSC from the point of view of the first eNB 11 graph, and 312 denotes the graph of RSWSC from the point of view of the second eNB 12. From the point of view of the first eNB 11, a maximum transfer rate for a UE located in the cell edge of the first eNB 11 is R13. This is limited to a case where the adjacent second eNB 21 uses a scheme of RSCD. Accordingly, from the point of view of the first eNB 11, the graph of the transfer rate for the UE located in the cell edge of the first eNB 11 is a straight-line graph that goes down up to the value of R12 in which the first eNB 11 uses a scheme of RIAN and then converges on the value of R12.

Furthermore, from the point of view of the second eNB 21, a maximum transfer rate for a UE located in the cell edge of the second eNB 21 may be value of R23. This corresponds to a case where the adjacent first eNB 11 uses the scheme of RSCD. Accordingly, from the point of view of the second eNB 21, the graph of the transfer rate for the UE located in the cell edge of the second eNB 21 is a straight-line graph that goes down up to the value of R22 in which the second eNB 21 uses the scheme of RIAN and the converges on the value of R12.

Accordingly, when only a situation in which the first eNB 11 and the second eNB 21 are adjacent is taken into consideration, the graph of a maximum transfer rate for a UE located in the cell edge may be an internal area 322. As a result, the transfer rate according to the RSWSC scheme according to the present disclosure may be higher than transfer rates according to the schemes RSCD and RIAN, that is, the existing schemes. For example, 321 may denote a maximum transfer rate which may be provided in the scheme of RIAN. Compared to the scheme of RIAN, at the maximum transfer rate of 321, data can be transmitted and received at a higher transfer rate corresponding to 331 at the transfer rate according to the RSWSC scheme according to the present disclosure.

In order for the aforementioned SWSC transmission/reception technology to be used in a cellular system, a scheduling method needs to be applied. Accordingly, in the present disclosure, a scheduling method for enabling the SWSC transmission/reception technology to be used in a cellular system is described.

An eNB or a specific network entity that controls eNBs uses a scheduling method of fully searching for all of eNBs that form a cellular network. Furthermore, when all of the eNBs are searched for, a pairing task in which an adjacent eNB needs to be taken into consideration has to be taken into consideration. In this case, pairing means that every two eNBs of a plurality of eNBs form a pair to which the aforementioned graph is to be applied. As described above, a 2-step process, including pairing for applying the SWSC scheme and user pairing for selecting a pair of UEs, may be performed.

An operation for an eNB to select pairing and user pairing is described in more detail with reference to the accompanying drawing.

Figure 4A:
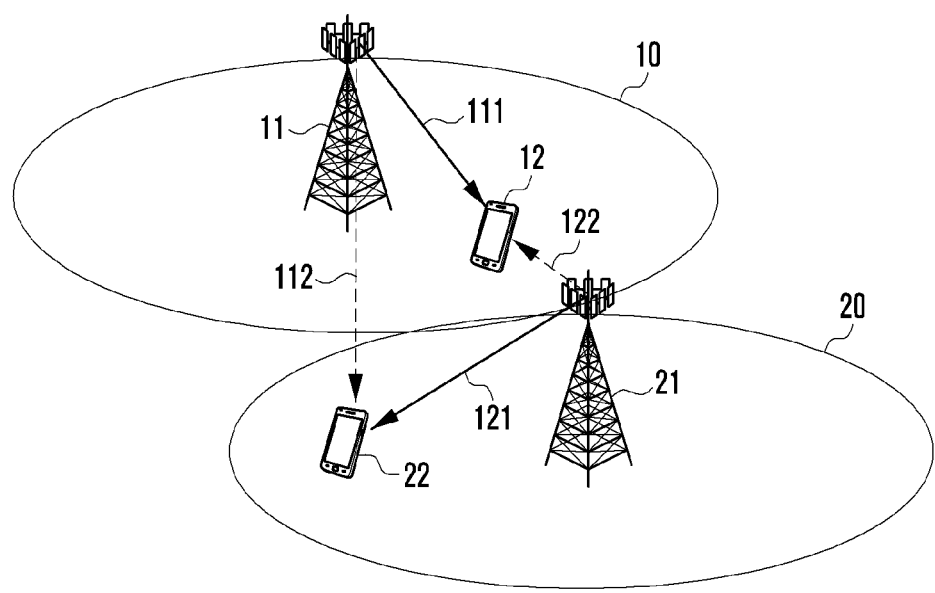
FIGS. 4A to 4C are exemplary diagrams for illustrating cell pairs according to the present disclosure.
Figure 4B:
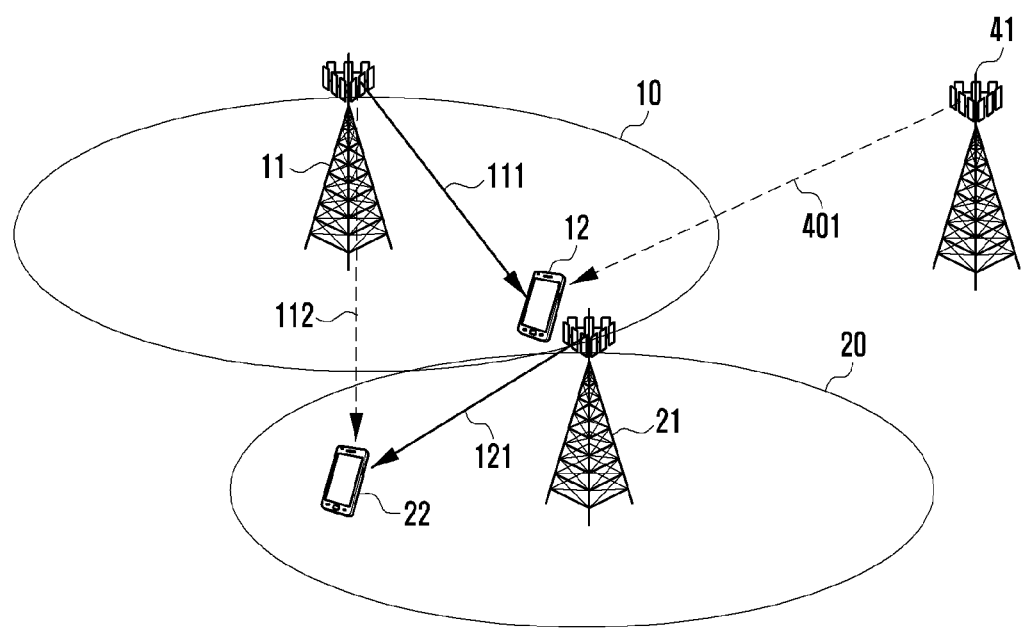
Figure 4C:
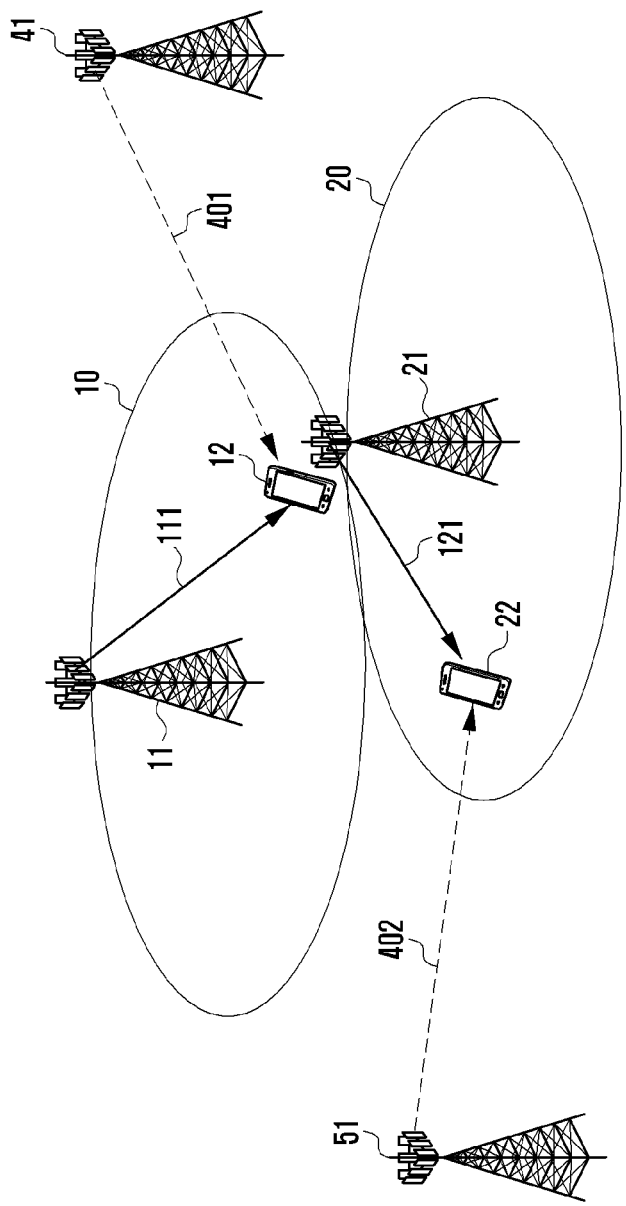

FIGS. 4A to 4C are exemplary diagrams for illustrating cell pairs according to the present disclosure.

First, interference between adjacent two eNBs is described with reference to FIG. 4A as described above with reference to FIG. 1. Furthermore, the same reference numerals of FIG. 4A as those of FIG. 1 are used.

Referring to FIG. 4A, a first UE 12 located within a first eNB 11 may receive a signal 111 received from the first eNB 11. Furthermore, the first UE 12 also receives a signal 122 received from a second eNB 21. In this case, from the point of view of the first UE 12, the signal 111 received from the first eNB 11 is a desired signal. From the point of view of the first UE 12, the signal 122 received from the second eNB 21 is an interference signal. If a situation in which two eNBs are adjacent as described above is taken into consideration, the interference signal received from the second eNB 21 may be a dominant interference signal. In this case, the dominant interference signal means a signal that belongs to signals received by a specific UE from other eNBs other than a desired signal and that has the strongest intensity or the greatest interference.

Likewise, a second UE 22 located within the second eNB 21 may receive a signal 121 received from the second eNB 21. Furthermore, the second UE 22 also receives a the signal 112 received from the first eNB 11. Accordingly, from the point of view of the second UE 22, the signal 121 received from the second eNB 21 is a desired signal. From the point of view of the second UE 22, the signal 112 received from the first eNB 11 is an interference signal. Furthermore, if a situation in which only two eNBs are adjacent as described above is taken into consideration, the interference signal received from the first eNB 11 may be a dominant interference signal.

The first eNB 11 and the second eNB 21 that provide dominant interference as described above may form a cell pair. In this case, the cell pair or cell pairing means that from the point of view of a specific reception UE, eNBs (or cells) providing dominant interference signals are grouped into one pair. Furthermore, in the following description, an eNB and a cell may be interchangeably used. The eNB or cell may be the end entity of a network that transmits a signal from the point of view of a reception UE.

FIG. 4B is a diagram illustrating a case where dominant interference from another adjacent eNB is present. Referring to FIG. 4B, a first UE 12 located within a first eNB 11 may receive a signal 111 received from the first eNB 11. Furthermore, the first UE 12 also receives a signal 401 received from a third eNB 41. In this case, from the point of view of the first UE 12, the signal 111 received from the first eNB 11 is a desired signal. From the point of view of the first UE 12, the signal 401 received from the third eNB 41 is an interference signal. The interference signal may be a dominant interference signal from another third eNB 41 other than the second eNB 21.

Furthermore, a second UE 22 located within a second eNB 21 may receive a signal 121 received from the second eNB 21. In this case, the second UE 22 also receives a signal 112 received from the first eNB 11. Accordingly, from the point of view of the second UE 22, as described above, the signal 121 received from the second eNB 21 is a desired signal. From the point of view of the second UE 22, the signal 112 received from the first eNB 11 may be a dominant interference signal.

As described above, an interference signal, that is, dominant interference, is not limited to two eNBs, but an interference signal from adjacent other eNBs may be a dominant interference signal. Accordingly, from the point of view of the first UE 12, the signal received from the third eNB 41 is a dominant interference signal. Accordingly, from the point of view of the first UE 12, the first eNB 11 and the third eNB 41 form a cell pair. In contrast, from the point of view of the second UE 22, the first eNB 11 and the second eNB 21 may form one cell pair as described with reference to FIG. 4A.

FIG. 4C is an exemplary diagram if a dominant interference signal for a second UE is a fourth eNB. Referring to FIG. 4C, a first UE 12 located in a first eNB 11 may receive a signal 111 received from the first eNB 11. Furthermore, the first UE 12 also receives a signal 401 received from a third eNB 41. Accordingly, as described above, from the point of view of the first UE 12, the signal received from the third eNB 41 may be a dominant interference signal.

Furthermore, a second UE 22 located within a second eNB 21 may receive a signal 121 received from the second eNB 21. In this case, the second UE 22 also receives a signal 402 received from a fourth eNB 51. Accordingly, from the point of view of the second UE 22, the signal 121 received from the second eNB 21 is a desired signal, and the signal 402 received from the fourth eNB 51 may be a dominant interference signal.

As described above, interference signals that provide dominant interference may be received from adjacent eNBs that are different from those of FIG. 4A. In this case, from the point of view of the first UE 12, the signal received from the third eNB 41 is a dominant interference signal. Accordingly, from the point of view of the first UE 12, the first eNB 11 and the third eNB 41 correspond to a cell pair. Furthermore, from the point of view of the second UE 22, the signal received from the fourth eNB 51 is a dominant interference signal. Accordingly, from the point of view of the second UE 22, the second eNB 21 and the fourth eNB 51 may form one cell pair.

In accordance with the aforementioned contents, it may look like that each UE forms a cell pair. However, when cell pairing is actually determined, from the point of view of a specific one UE, cell pairing is determined on the assumption of a case where the number of UEs influenced by dominant interference from neighboring cells, that is, adjacent two eNBs, is many, rather than a case where dominant interference is present is taken into consideration. That is, as in FIGS. 4A to 4C, the number of UEs influenced by dominant interference may be previously detected with respect to the UEs, and cell pairing may be determined based on the number of UEs influenced by the detected dominant interference. The reason why cell pairing is determined as described above is that it may be expected that a case where neighboring two cells are subject to mutual dominant interference has higher performance than a case where neighboring two cells are not subject to mutual dominant interference, that is, a case such as FIG. 4B or 4C, if the SWSC scheme is used. Accordingly, cell pairing with a cell having great dominant interference between UEs present within the cells of eNBs may be determined.

After cell pairing is determined as described above, a pair according to the SWSC scheme is determined in order from a higher value to a lower value based on a difference between the sum of proportional fairness (PF) based on SWSC (SWSC sum PF) according to the present disclosure and the sum of proportional fairness of the IAN method (IAN sum PF) that belongs to existing methods and that treats interference as noise with respect to UEs included in been cell-paired cells. An SWSC pair selected as described above is cancelled from a list of UEs included in cells, thereby being capable of determining the transfer rate of all of UEs. In this case, the value 331 of FIG. 3 may be the difference between the SWSC sum PF and the IAN sum PF.

Figure 5:
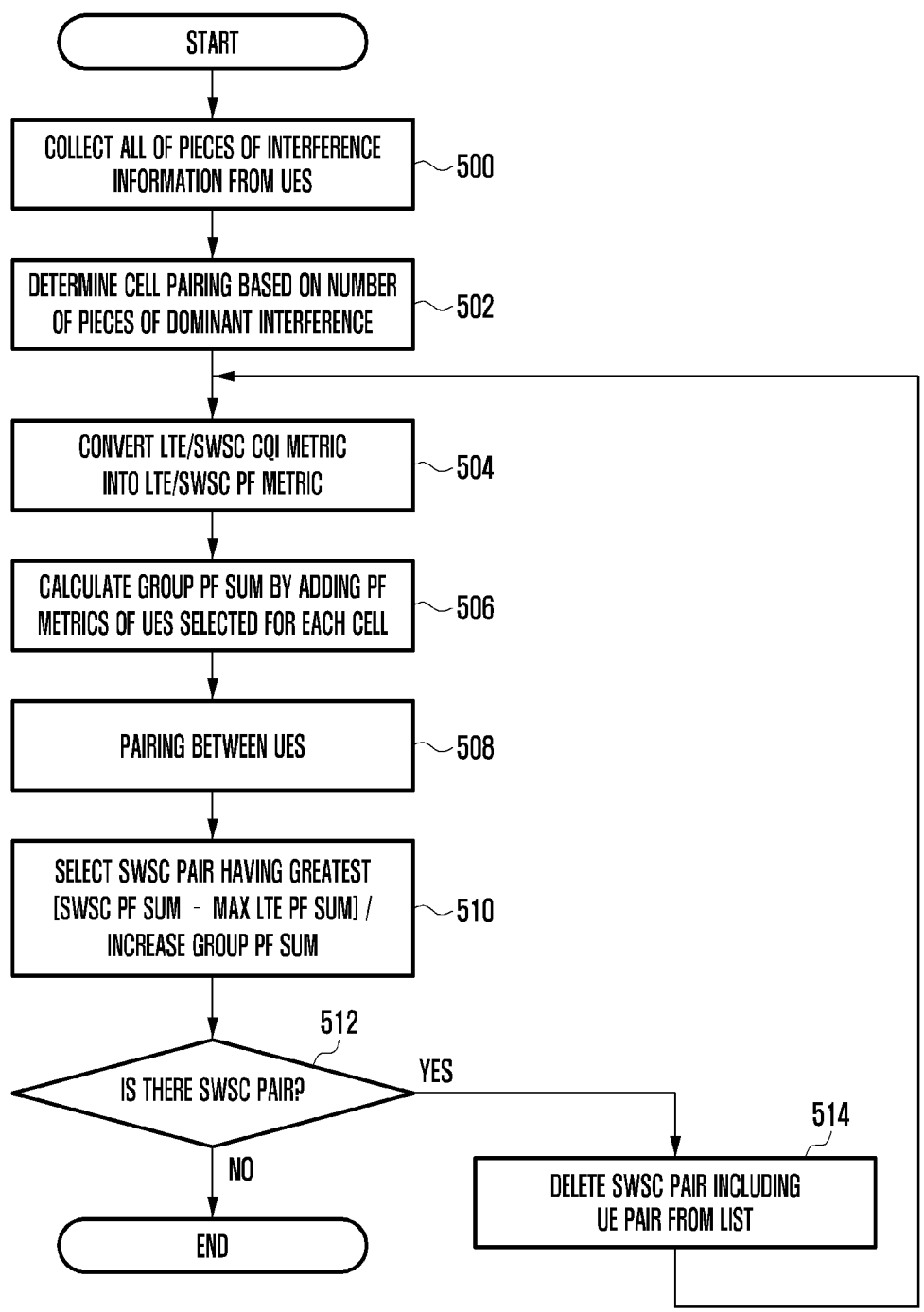
FIG. 5 is a control flowchart upon scheduling if the SWSC scheme according to the present disclosure is applied.

FIG. 5 is a control flowchart upon scheduling if the SWSC scheme according to the present disclosure is applied.

Prior to reference to FIG. 5, in order to apply the SWSC scheme to eNBs, a specific one eNB or a network entity over the eNB needs to perform the operation of FIG. 5. If one of a plurality of eNBs performs the operation of FIG. 5, it needs to be capable of receiving information from other eNBs using the configuration of the backhaul 30 connected between the eNBs as in FIG. 1 and proving information for control. Furthermore, if a specific network entity is present over an eNB, it may have a configuration for receiving specific information from each eNB, performing the control operation of FIG. 5 based on the information, and receiving a control message according to the results. Furthermore, if an eNB controls a plurality of TPs connected to the lower position of the eNB in a 5G network, an operation performed in the eNB may be performed.

In the following description, it is assumed that a network entity is located over eNBs (including an eNB managing a plurality of TPs in a 5G network), for convenience of description. In the following description, the network entity is referred to as a "centralized device."

At operation 500, the centralized device collects interference information of all of UEs performing communication within each eNB from the eNBs connected to the centralized device 500. Several methods may be used as such a collection operation. For example, a specific eNB may receive channel quality information from a UE performing communication within its own area. Furthermore, the specific eNB may receive signal intensity information or information capable of determining interference, received from an adjacent eNB, from a corresponding UE. That is, the specific eNB receives information capable of determining interference from all of UEs located within its own communication area (within a cell). Furthermore, the specific eNB may provide the centralized device with information collected as described above. eNBs using the SWSC scheme according to the present disclosure may receive all of pieces of interference information of UEs that are located within its own cell and perform communication in order to receive scheduling information from the centralized device, and may provide the interference information to the centralized device. Through such an operation, the centralized device may obtain all of pieces of interference information from UEs at operation 500.

Thereafter, at operation 502, the centralized device may determine the priority of a pair, that is, an SWSC pair, to which the SWSC scheme according to the present disclosure will be applied using only dominant interference information for each UE. As described above, such an operation may correspond to an operation of searching for an eNB having dominant interference with respect to all of UEs within a specific cell without using only a specific one UE, and performing cell pairing. That is, this may correspond to a case where all of the UEs illustrated in the example of FIGS. 4A to 4C are different. That is, in the case of FIG. 4A, the first eNB and the second eNB may be paired because in the case of a specific UE included in the first eNB 11, the second eNB 21 is a dominant interference eNB. In contrast, in FIG. 4B, in the case of a specific UE included in the first eNB, not the second eNB 21, but the third eNB 41 may be a dominant interference eNB. In this case, the first eNB and the third eNB may be paired.

Accordingly, two or more dominant interference eNBs may be present with respect to a specific one eNB. In this case, a case where the number of UEs that have reported a corresponding eNB as a dominant interference eNB is many may be set as a dominant interference eNB. For example, it is assumed that when the centralized device determines a dominant interference eNB of a first eNB, it has to select one of a second eNB and a third eNB. In this case, if the number of UEs that have reported the second eNB as a dominant interference eNB is "m" and the number of UEs that have reported the third eNB as a dominant interference eNB is "n", the centralized device may compare the value "m" with the value "n" and set an eNB having a greater value as a dominant interference eNB.

If m is 3 and n is 4, the third eNB may become a dominant interference eNB of the first eNB. In contrast, if m is 3 and n is 2, the second eNB may become a dominant interference eNB of the first eNB. Furthermore, if m and n are the same, the following various methods may be used. First, if m and n are the same, the centralized device may randomly select one of the second eNB and the third eNB and determine the selected eNB to be a dominant interference eNB. In another method, the centralized device may determine which eNB is a dominant interference eNB of the first eNB from the point of view of the second eNB and the third eNB, and may set a dominant interference eNB of the first eNB. If the first eNB is a dominant interference eNB in the case of the second eNB and the fourth eNB is a dominant interference eNB in the case of the third eNB, the centralized device may set the second eNB as a dominant interference eNB for the first eNB.

As described above, an operation of determining pairing with respect to all of UEs included in a specific cell (or eNB) may be performed through the aforementioned method. After the pairing is performed, the priority of pieces of pairing may be determined based on dominant interference information.

Thereafter, the centralized device proceeds to operation 504 and converts LTE/SWSC CQI metric according to the information collected from each of UEs within a selected cell pair into LTE/SWSC PF metric. That is, the centralized device converts the LTE/SWSC CQI metric in the form of a graph, such as that described with reference to FIG. 3. Accordingly, if the SWSC scheme is applied at operation 504, the centralized device may obtain a graph for determining a maximum transfer rate.

After obtaining the graph for determining a maximum transfer rate, the centralized device calculates a group PF sum by adding LTE PF metrics of the UEs selected for each cell at operation 506. Furthermore, the centralized device performs pairing between the UEs at operation 508. That is, at operation 508, the centralized device calculates an SWSC PF sum corresponding to the best combination by taking into consideration all of combinations for each decoding order capable of providing high throughput with respect to a pair of UE. In this case, the decoding order capable of providing high throughput is pairing between UEs using dominant interference eNBs, and may generate a list of pieces of SWSC pairing between all of UEs having interference. In this case, the SWSC pairing operation of the UEs may be performed if the SWSC PF sum is greater than the LTE PF sum.

Thereafter, at operation 510, the centralized device may select an SWSC pair that belongs to pairs present in a current SWSC pairing list and that has the greatest value of "SWSC PF sum max LTE PF sum", and may calculate a group PF sum using the selected SWSC pair. After calculating the group PF sum using the selected SWSC pair, the centralized device may check whether an SWSC pair is additionally present in the selected SWSC pair list at operation 512. If, as a result of the check, an SWSC pair is present, the centralized device may proceed to operation 514, may delete the SWSC pair selected at operation 510 and calculated in the group PF sum, and may proceed to operation 504.

After one SWSC pair is deleted as described above, the centralized device may perform the same operation on other SWSC pairs by performing an operation from operation 504 using the remaining SWSC pairs in the state in which the corresponding SWSC pair has been excluded.

If all of the operations repeated as described above are performed, a group PF sum may be calculated with respect to all of the SWSC pairs within the SWSC pair list. Accordingly, when the group PF sum is calculated with respect to all of the SWSC pairs within the SWSC pair list, the centralized device may terminate the routine of FIG. 5.

If SWSC scheduling described above according to the first embodiment is applied, to determine order based on a difference between the SWSC sum PF and the IAN sum PF may not essentially maximize an SWSC sum rate/PF. The reason for this is that although the difference between the SWSC sum PF and the IAN sum PF is small, the absolute value of the SWSC sum/PF may be great. Furthermore, if a cell pair is determined based on the number of pieces of dominant interference, metric at which the SWSC sum rate/PF is maximized may not be obtained. In general, if the number of pieces of dominant interference is many, there is a high probability that performance can be improved due to SWSC. The reason for this is that if the number of pieces of dominant interference is only one, the SWSC sum rate/PF may increase.

Furthermore, complexity is increased because all of pairs must be taken into consideration when the pairing of cells is determined and when pairs of UEs are ordered based on metric as described above. For example, assuming that the number of cooperating cells is N and the number of UEs served in each cell is m, computational complexity is determined to be "max[O(N2), O(m2)]." If the number of cooperating cells or the number of UEs increases, computational complexity increases in proportion to square.

Accordingly, in the second embodiment of the present disclosure to be described below, a scheduling method capable of reducing complexity while directly maximizing the SWSC sum rate/PF and an apparatus using the same are additionally described. If the method according to the second embodiment of the present disclosure is applied, a data transfer rate for a UE located in a cell edge can be increased. Furthermore, if the method according to the second embodiment of the present disclosure is applied, complexity can be linearly decreased and thus the time taken for scheduling can be reduced.

The second embodiment of the present disclosure provides a max sum rate/PF SWSC scheduling method based on a dominant interference graph in order to solve the aforementioned problems and an apparatus using the same. The apparatus according to the present disclosure may perform the following operation.

The centralized device selects a UE capable of achieving the best sum rate/PF for each cell based on all of pieces of SWSC feedback information received from UEs.

The centralized device generates a dominant interference graph within a cooperating cell based on the UE selected for each cell.

The centralized device sequentially calculate the amounts of transmission for each UE one by one at once within the generated dominant interference graph.

The centralized device is enabled to calculate the amounts of transmission of UEs dispersively and in parallel with respect to all of possible combinations of an MCS, PMI and RI through parallel processing.

For such an operation, the eNB of each cell needs to provide the centralized device with the following information. First, the eNBs of cells need to provide the centralized device with information about a combination of a serving channel within its own cell and dominant interference channels from neighbor cells. Furthermore, each of the eNBs of the cells transfers CSI feedback information, including information about an MCS pair achievable with respect to each of a PMI and RI, to the centralized device when performing an SWSC operation. The centralized device may perform scheduling using such information.

Thereafter, when the scheduling is completed, the centralized device needs to provide the eNB with the following information.

The centralized device may transmit information indicative of an RI, PMI and MCS, which may be used to transmit data to which UE, to each eNB. Furthermore, the centralized device may transmit information indicative of an RI, PMI and MCS for an interference signal whose dominant interference must be determined by a specific UE to each eNB. If the centralized device transmits information indicative of an RI, PMI and MCS for an interference signal whose dominant interference must be determined by a specific UE to each eNB, the corresponding eNB may transmit the information to a corresponding UE. Furthermore, when the UE receives the information indicative of an RI, PMI and MCS for an interference signal whose dominant interference must be determined, it may restore the interference signal using the received information.

Figure 6:
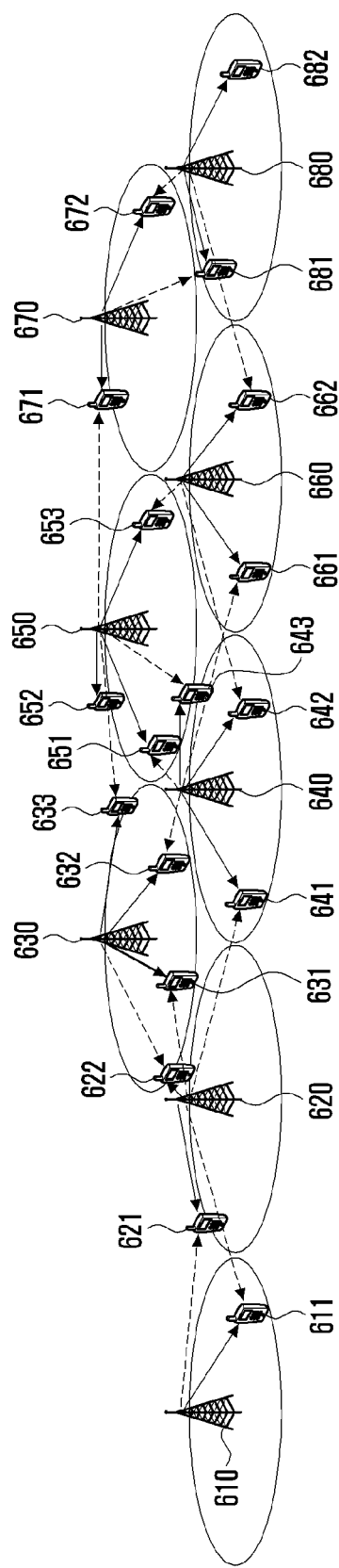
FIG. 6 is an exemplary diagram illustrating an interference environment for illustrating dominant interference signals and desired signals in a plurality of eNBs according to the present disclosure.

FIG. 6 is an exemplary diagram illustrating an interference environment for illustrating dominant interference signals and desired signals in a plurality of eNBs according to the present disclosure.

Referring to FIG. 6, different eight eNBs 610, 620, 630, 640, 650, 660, 670 and 680 have cells, that is, their own communication areas, and may perform communication with UEs located within the cells. The first eNB 610 is illustrated as communicating with one UE 611 located within its own cell. The second eNB 620 is illustrated as communicating with two UEs 621 and 622 located within its own cell. The third eNB 630 is illustrated as communicating with three UEs 631, 632 and 633 located within its own cell. The fourth eNB 640 is illustrated as communicating with three UEs 641, 642 and 643 located within its own cell. The fifth eNB 650 is illustrated as communicating with three UEs 651, 652 and 653 located within its own cell. The sixth eNB 660 is illustrated as communicating with two UEs 661 and 662 located within its own cell. The seventh eNB 670 is illustrated as communicating with the two UEs 671 and 672 located within its own cell. The eighth eNB 680 is illustrated as communicating with two UEs 681 and 682 located within its own cell.

In FIG. 6, all of arrows indicated by solid lines mean UEs communicating with specific eNBs. Accordingly, from the point of view of the UE, all of the arrows indicated by solid lines may be desired signals.

Furthermore, FIG. 6 also illustrates dominant interference signals corresponding to the UEs. FIG. 6 illustrates that the second eNB 620 is an eNB that generates dominant inference in the case of the UEs 611 included in the first eNB 610, the first eNB 610 is an eNB that generates dominant inference in the case of the UE 621 included in the second eNB 620, the third eNB 630 is an eNB that generates dominant inference in the case of the 622 included in the second eNB 620, the second eNB 620 is an eNB that generates dominant inference in the case of the UE 631 included in the third eNB 630, the fourth eNB 640 is an eNB that generates dominant inference in the case of another UE 632 included in the third eNB 630, and the fifth eNB 650 is an eNB that generates dominant inference in the case of another UE 633 included in the third eNB 630.

In the case of the UE 641 included in the fourth eNB 640, the second eNB 620 is an eNB that generates dominant inference. In the case of another UE 642 included in the fourth eNB 640, the sixth eNB 660 is an eNB that generates dominant inference. In the case of another UE 643 included in the fourth eNB 640, the fifth eNB 650 is an eNB that generates dominant inference. Furthermore, in the case of the UE 651 included in the fifth eNB 650, the fourth eNB 640 is an eNB that generates dominant inference. In the case of another UE 652 included in the fifth eNB 650, there is no eNB that generates dominant interference. In the case of another UE 653 included in the fifth eNB 650, the sixth eNB 660 is an eNB that generates dominant inference.

In the case of the UE 661 included in the sixth eNB 660, the fourth eNB 640 is an eNB that generates dominant inference. In the case of another UE 662 included in the sixth eNB 660, the eighth eNB 680 is an eNB that generates dominant inference. Furthermore, in the case of the UE 671 included in the seventh eNB 670, the fifth eNB 650 is an eNB that generates dominant inference. In the case of another UE 672 included in the seventh eNB 670, the eighth eNB 680 is an eNB that generates dominant inference. Finally, in the case of the UE 681 included in the eighth eNB 680, the seventh eNB 670 is an eNB that generates dominant inference. In the case of another UE 682 included in the eighth eNB 680, there is no eNB that generates dominant interference.

Furthermore, all of arrows indicated by dotted lines in FIG. 6 mean dominant interference signals for UEs communicating with specific eNBs. Accordingly, from the point of view of the UEs, all of the arrows indicated by dotted lines, are dominant interference signals from specific eNBs from adjacent eNBs, and there may be other interference signals. FIG. 6 illustrates only the dominant interference signals.

An eNB may obtain information about dominant interference eNBs illustrated as described above from each UE that performs communication in its own cell. Accordingly, each eNB may obtain information about a dominant interference cell (eNB) based on information received from each UE that performs communication in its own cell, and may provide the information to the centralized device (not shown in FIG. 6). In this case, although not shown in FIG. 6, the centralized device may have been connected to each eNB through a specific interface. Furthermore, as described above, the centralized device may be configured to be executed in a specific one eNB. For another example, in the case of a 5G network whose standardization is in progress, each eNB may correspond to one transmission and reception point. Accordingly, if each eNB is one transmission and reception point, it may be eNB (or gNB) controlling the transmission and reception point. For another example, in the case of an LTE and/or LET-A system, each eNB may be a higher entity for controlling each eNB.

As illustrated in FIG. 6, each eNB may collect information about eNBs that provide dominant interference signals to a UE while communicating with the UE served by the eNB in its own cell. As described above, an eNB transmits information collected from UEs to the centralized device. In this case, the transmitted information may include CSI information related to the SWSC scheme according to the present disclosure.

Figure 7:
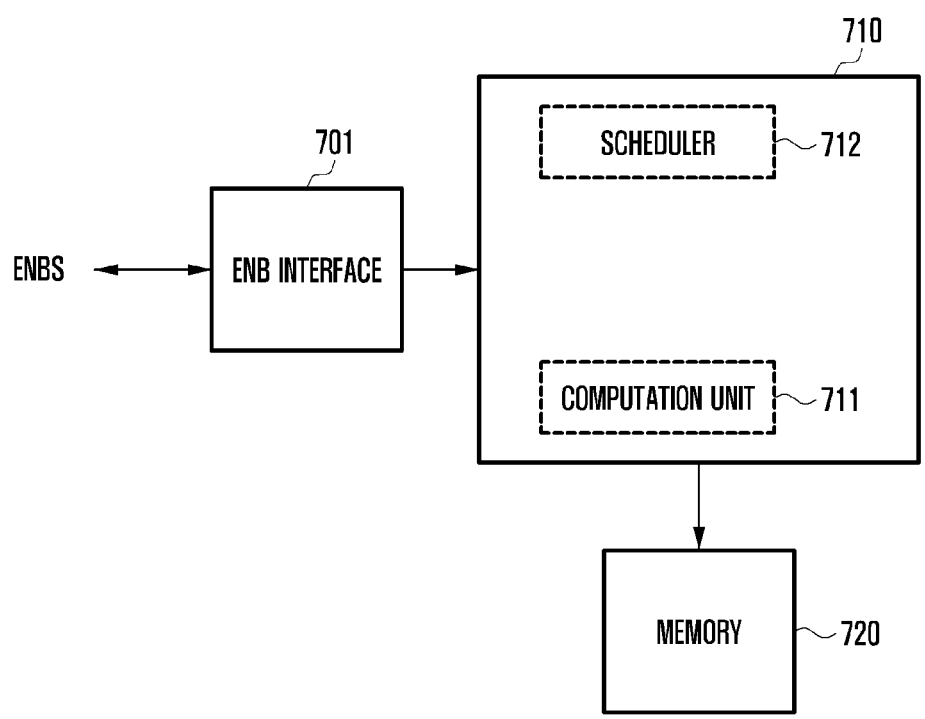
FIG. 7 is a functional block diagram of a centralized device according to the present disclosure.

FIG. 7 is a functional block diagram of the centralized device according to the present disclosure.

Referring to FIG. 7, an eNB interface 701 provides an interface capable of communication with each eNB, as illustrated in FIG. 6. Accordingly, the eNB interface 701 receives information from each eNB and outputs it to a controller 710. Furthermore, the eNB interface 701 may transmit scheduled information, provided by the controller 710, to a corresponding eNB.

The controller 710 may perform overall control according to the present disclosure. The controller 710 may include at least one processor. If the controller includes one processor, it may have one core or a plurality of cores. Furthermore, if the controller 710 includes two or more processors, the two or more processors may be configured to perform parallel processing. If the controller 710 includes one processor and has a plurality of cores, the plurality of cores may be configured to perform parallel processing. The controller 710 may include a scheduler 712 for scheduling each eNB and a computation unit 711 for performing computational processing for providing the best transfer rate based on information received from each eNB. The scheduler 712 and the computation unit 711 may be configured as separate processors or may be implemented in an internal program form. Furthermore, a plurality of the computation units 711 may be configured. If the controller 710 includes a plurality of processors or a plurality of cores, each computation unit may include one processor or one core. A control operation performed in the controller 710 according to the present disclosure is described in more detail with reference to the accompanying drawing. Furthermore, in the following description, the operation of the scheduler 712 and the operation of the computation unit 711 are illustrated as being performed in the controller 710 without separating them other than a special case, for convenience of description.

Memory 720 may store a program for control of the centralized device according to the present disclosure. Furthermore, the memory 720 has regions in which information received from each eNB is stored and information generated according to the present disclosure is stored. In the present disclosure, the memory 720 is not limited to any configuration method if it can store data.

Figure 8:
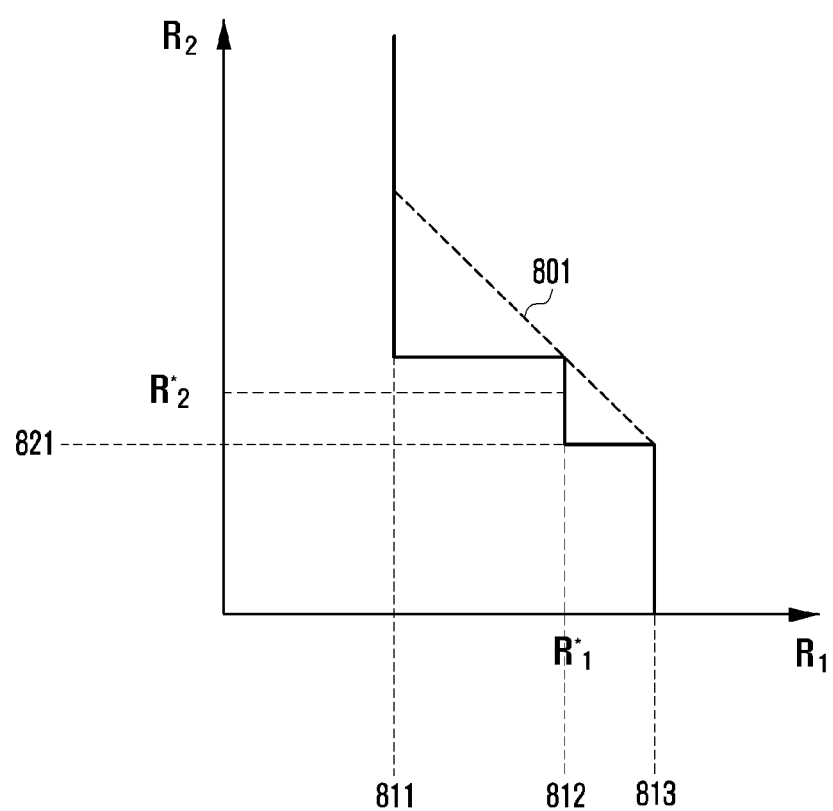
FIG. 8 is an exemplary diagram of a graph for determining the transfer rate of data which may be transmitted from the centralized device to a specific UE according to the present disclosure.

FIG. 8 is an exemplary diagram of a graph for determining the transfer rate of data which may be transmitted from the centralized device to a specific UE according to the present disclosure.

Prior to reference to FIG. 8, first, as described above, the centralized device may have received CSI information for applying the SWSC scheme to UEs that perform communication within each eNB from the corresponding eNB. Furthermore, the CSI information for applying the SWSC scheme to the UEs that perform communication within each eNB may be received from the corresponding eNB for each specific cycle or may be received when an event, such as that a new UE starts communication at the edge of an eNB, is generated. The centralized device determines the transfer rate of each UE using such information. The amount of data traffic for each UE may be scaled within each eNB (and/or cell) based on proportional fairness (PF), if necessary.

The centralized device calculates a transfer rate and/or proportional fairness (rate/PF), which may be obtained from current SWSC transmission and reception, based on the amount of traffic (or transfer rate) of SWSC according to a dominant interference cell at each previous point of time. This is described with reference to FIG. 8.

In FIG. 8, it is assumed that an eNB attempting to determine a data transfer rate is a first eNB and an adjacent second eNB is an eNB that generates dominant inference. In this case, if the amount of traffic (transfer rate) of dominant interference provided by the second eNB is R*2, the amount of traffic (or transfer rate) R*1 of a UE to which data will be transmitted by the first eNB needs to be determined. A graph 801 is the graph of RSWSC calculated using a scheme, such as that in FIG. 3. That is, a location 813 may be a maximum transfer rate only when the second eNB is taken into consideration. If the adjacent second eNB uses the scheme of RSCD, the transfer rate is decreased in a straight-line form having a negative (−) slope from a location 821 to a location 811 at which the adjacent second eNB uses the scheme of RIAN, and may have a form that converges from a value at which the adjacent second eNB uses the scheme of RIAN.

In this case, since the amount of traffic (or transfer rate) of the dominant interference provided by the second eNB has already been determined to be R*2 that is a specific value, a UE that may have a maximum amount of traffic (or transfer rate) in the range of the graph 801 may be selected. Such an operation may be likewise performed in all of cells. Accordingly, the first eNB may select one UE and likewise, the second eNB may also select one UE. A form in which one UE has been selected for each eNB as described above is described with reference to FIG. 9A.

Figure 9A:
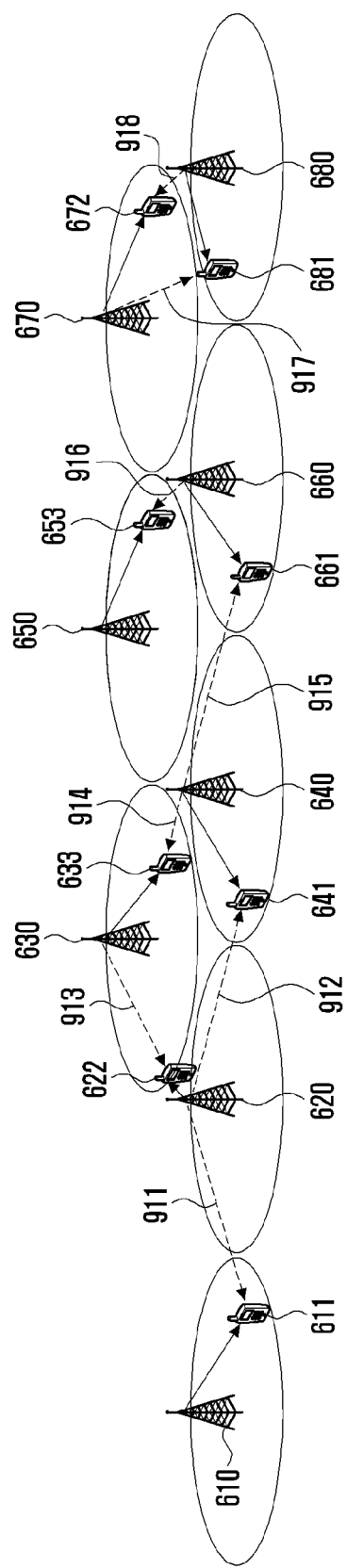
FIG. 9A is an exemplary diagram if one UE to which a maximum transfer rate can be provided has been selected in a dominant interference environment for each eNB according to the method of the present disclosure.

FIG. 9A is an exemplary diagram if one UE to which a maximum transfer rate can be provided has been selected in a dominant interference environment for each eNB according to the method of the present disclosure.

Referring to FIG. 9A, as described above, different eight eNBs 610, 620, 630, 640, 650, 660, 670 and 680 have respective cells, that is, their own communication areas, and each eNB may perform communication with UEs located in the corresponding eNB. In FIG. 9A, one UE 611 that belongs to UEs located within the first eNB 610 and that has been selected as described above has been illustrated. The UE 611 selected in the first eNB 610 has dominant interference 911 from the second eNB 620. Furthermore, one UE 622 that belongs to UEs located within the second eNB 620 and that has been selected as described above has been illustrated. The UE 622 selected in the second eNB 620 has dominant interference 913 from the third eNB 630. One UE 633 that belongs to UEs located within the third eNB 630 and that has been selected as described above has been illustrated. The UE 633 selected in the third eNB 630 has dominant interference 914 from the fourth eNB 640. One UE 641 that belongs to UEs located within the fourth eNB 640 and that has been selected as described above has been illustrated. The UE 641 selected in the fourth eNB 640 has dominant interference 912 from the second eNB 620.

Furthermore, one UE 653 that belongs to UEs located within the fifth eNB 650 and that has been selected as described above has been illustrated. The UE 653 selected in the fifth eNB 650 has dominant interference 916 from the sixth eNB 660. One UE 661 that belongs to UEs located within the sixth eNB 660 and that has been selected as described above has been illustrated. The UE 661 selected in the sixth eNB 660 has dominant interference 915 from the fourth eNB 640.

Likewise, one UE 672 that belongs to UEs located within the seventh eNB 670 and that has been selected as described above has been illustrated. The UE 672 selected in the seventh eNB 670 has dominant interference 918 from the eighth eNB 680. Finally, one UE 681 that belongs to UEs located within the eighth eNB 680 and that has been selected as described above has been illustrated. The UE 681 selected in the eighth eNB 680 has dominant interference 917 from the seventh eNB 670.

Furthermore, as described above, all of arrows indicated by solid lines in FIG. 9A mean UEs that perform communication with specific eNBs. All of arrows indicated by dotted lines mean dominant interference signals (or dominant interference) for UEs that perform communication with specific eNBs.

Figure 9B:
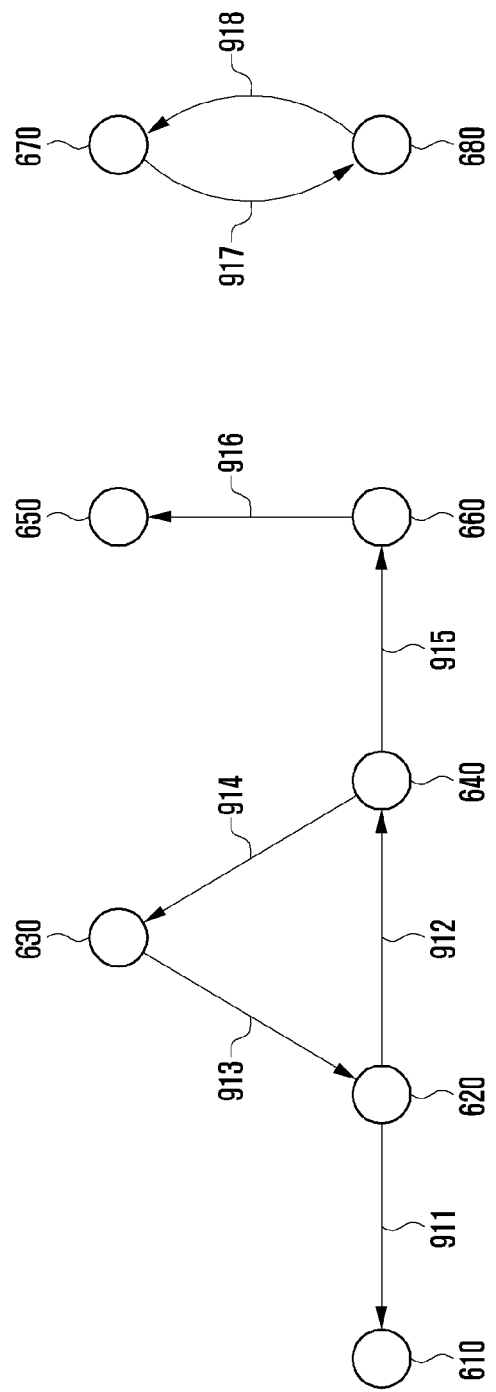
FIG. 9B shows graphs of eNBs having dominant interference based on UEs selected for each eNB in FIG. 9A.

FIG. 9B shows graphs of eNBs having dominant interference based on UEs selected for each eNB in FIG. 9A.

FIG. 9B shows that the first eNB 610 to the eighth eNB 680 are subject to dominant interference from which eNB. The first eNB 610 has been subjected to the dominant interference 911 from the second eNB 620. The second eNB 620 has been subjected to the dominant interference 913 from the third eNB 630. Furthermore, the third eNB 630 has been subjected to the dominant interference 914 from the fourth eNB 640. The fourth eNB 640 has been subjected to the dominant interference 912 from the second eNB 620. The sixth eNB 660 has been subjected to the dominant interference 915 from the fourth eNB 640. The fifth eNB 650 has been subjected to the dominant interference 916 from the sixth eNB 660. Finally, the seventh eNB 670 and the eighth eNB 680 have been mutually subjected to the dominant interference 917 and 918.

If eNBs having mutual dominant interference are determined as in FIG. 9B, a transfer rate for transmitting data to a corresponding UE needs to be calculated. In this case, in the present disclosure, in the graph of FIG. 9B illustrating dominant interference, connected cycle component groups including connected cycle components are present. The connected cycle component groups include two groups. One group includes cycle component eNBs in which the second eNB 620, the third eNB 630 and the fourth eNB 640 are connected, and the other group includes cycle component eNBs in which the seventh eNB 670 and the eighth eNB 680 are connected.

In the present disclosure, as described above, a specific one of the two connected cycle component groups is selected, and one connected cycle component eNB is selected from the selected group. In the present disclosure, it is assumed that the first group is selected and the third eNB 630 is selected from the first group.

In FIGS. 9A and 9B, at least two dominant eNBs are not present in at least one of eNBs within a connected cycle component group because one eNB includes a single dominant interference eNB. If the amounts of dominant interference from two different eNBs are the same from the point of view of a specific one eNB, a specific one of the two eNBs may be selected as a dominant interference eNB. In another method, a specific one eNB may be selected and analyzed using a dominant interference graph. After the transfer rate of the specific one eNB is determined, one of unselected eNBs may be selected and analyzed using a dominant interference graph, and the transfer rate of the selected eNB may be determined.

One eNB having the highest transfer rate of the set transfer rates may be set as a dominant interference eNB and a transfer rate may be calculated.

Accordingly, an operation for selecting one of connected cycle component eNBs and determining the transfer rate of each eNB is described with reference to FIGS. 10A to 10C.

Figure 10A:
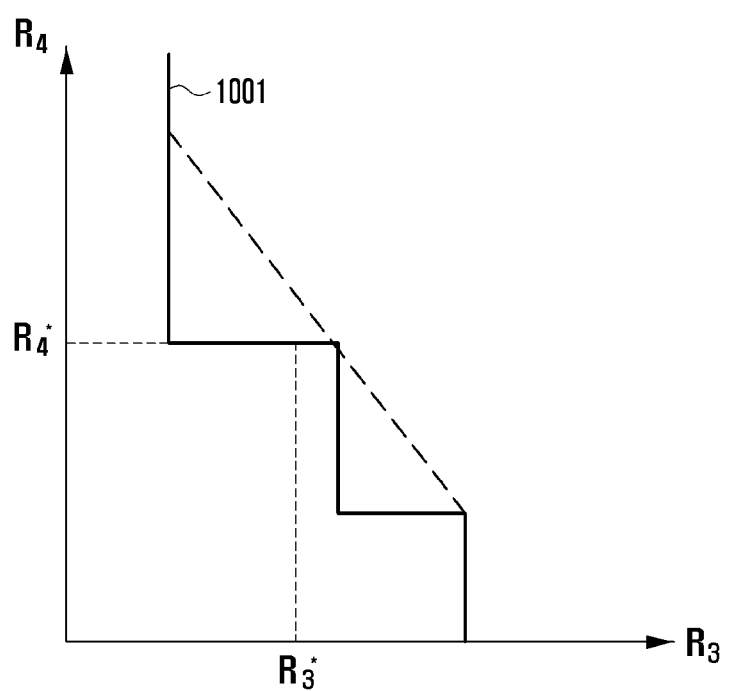
FIGS. 10A to 10C are graphs showing the transfer rates of the SWSC scheme for illustrating the determination of the transfer rate between dominant interference eNBs according to the present disclosure.
Figure 10B:
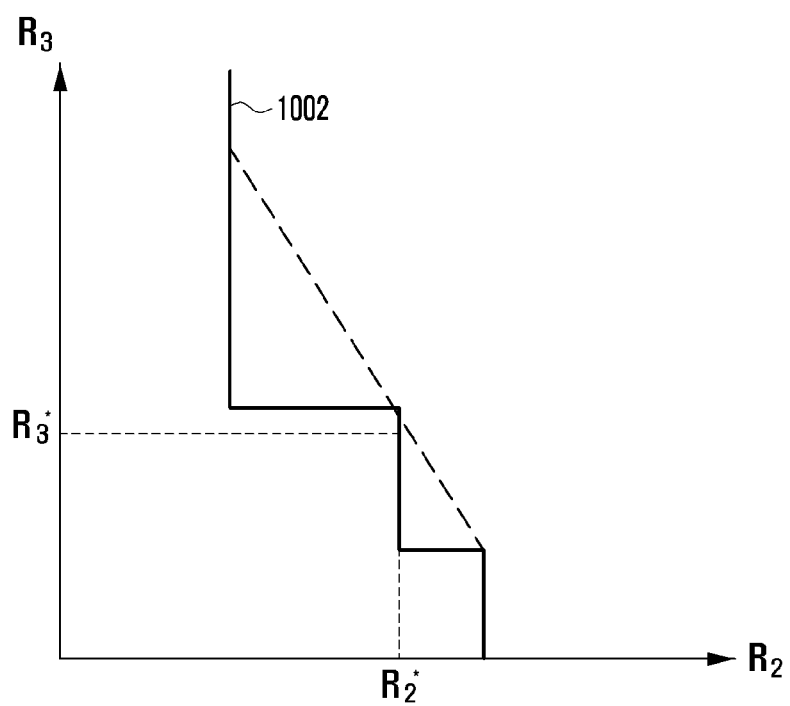
Figure 10C:
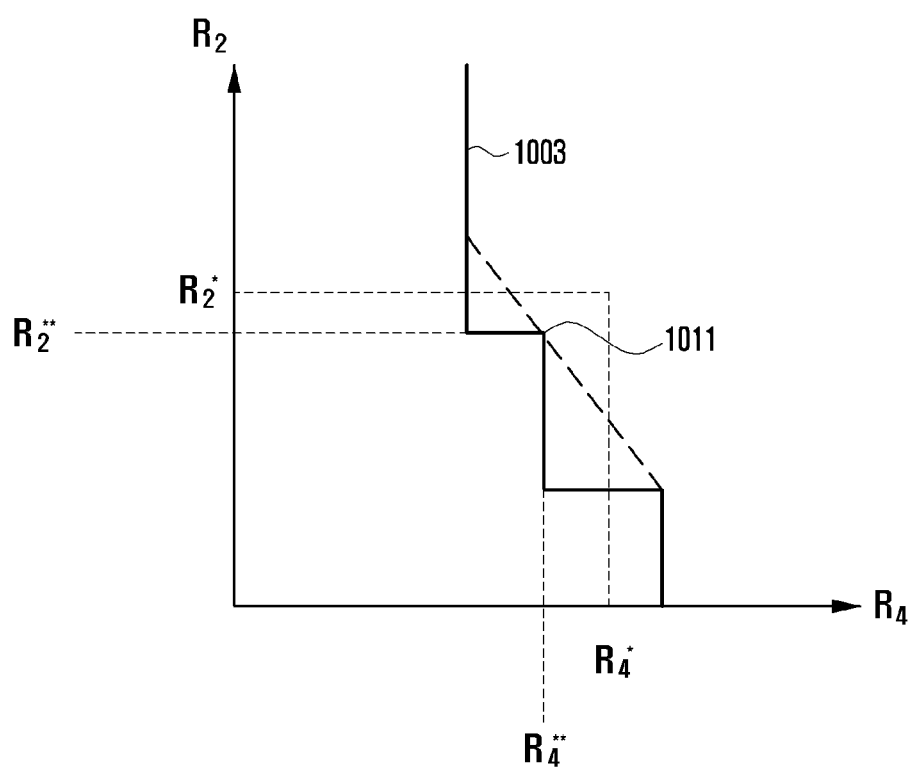

FIGS. 10A to 10C are graphs showing the transfer rates of the SWSC scheme for illustrating the determination of the transfer rate between dominant interference eNBs according to the present disclosure.

After selecting the third eNB 630, the transfer rate graph of the SWSC scheme, such as FIG. 3, may be generated. As described above, the transfer rate graph of the SWSC scheme has an SWSC-achievable rate region. That is, as illustrated in FIG. 10A, in the transfer rate graph of the SWSC scheme, a transfer rate graph 1001 between the third eNB 630 and the fourth eNB 640 providing dominant interference to the third eNB 630 may be generated. Accordingly, a specific value of the transfer rate to be provided to the UE 633 selected within the third eNB 630 is set as R3* based on the generated transfer rate region to which the SWSC scheme may be applied. Accordingly, a value of R3 is set as R3*, and a value of the transfer rate R4 of the UE 641 selected in the fourth eNB 640 that generates dominant interference with the third eNB 630 may be set as any value equal to or smaller than a value of R4*.

Furthermore, since the third eNB 630 is an eNB providing dominant interference to the second eNB 620, a transfer rate graph of the SWSC scheme may be generated as in FIG. 10B. The transfer rate graph of the SWSC scheme has an SWSC-achievable rate region. As illustrated in FIG. 10B, a transfer rate graph 1002 between the second eNB 620 and the third eNB 630 providing dominant interference to the second eNB 620 may be generated. In this case, since a specific value of the transfer rate to be provided to the UE 633 already selected in the third eNB 630 at the previous operation has been selected as R3*, a value of the transfer rate R2 of the UE 622 selected in the second eNB 620 may be set as any value equal to or smaller than the value of R2*.

As described above, after the value of the transfer rate R2 of the UE 622 selected in the second eNB 620 is set as the value of R2*, a transfer rate graph 1003 of the SWSC scheme with the fourth eNB may be generated as in FIG. 10C using the value of the transfer rate R2* set in the second eNB 620.

In this case, as illustrated in FIG. 10C, the previously set value of R2* and the previously set value of R4* may have been deviated from the SWSC-achievable rate region. If the previously set value of R2* and the previously set value of R4* have been deviated from the SWSC-achievable rate region as described above, the value of R2* and the value of R4* need to be set again. That is, as illustrated in FIG. 10C, the value of R2* may be set again as a value of R2**, that is, a maximum value in the SWSC-achievable rate region, and the value of R4* may be set again as a value of R4, that is, a maximum value in the SWSC-achievable rate region. Accordingly, as indicated by 1011, R2, that is, a maximum transfer rate in the second eNB 620, may be set as the value of R2, and R4, that is, a maximum transfer rate in the fourth eNB 640, may be set as the value of R4**.

An example in which the transfer rates of connected cycle component eNBs are determined has been described above. If the transfer rates of the connected cycle component eNBs are determined as described above, the transfer rates of eNBs adjacent to the connected cycle component eNBs may be sequentially calculated through a graph of a form, such as those of FIG. 3 and FIGS. 10A to 10C.

Thereafter, other connected cycle component eNBs may be searched for. Referring to FIG. 9B, the seventh eNB 670 and the eighth eNB 680 may correspond to the retrieved connected cycle component eNBs. Accordingly, the transfer rates of the seventh eNB 670 and the eighth eNB 680 may be determined using the same method as that for the second eNB 620, the third eNB 630 and the fourth eNB 640.

In this case, although the controller 710 of the centralized device includes a plurality of processors or one processor, if the controller 710 has a plurality of cores, the determination and calculation of the transfer rate of independent connected cycle component eNBs may be performed in parallel. Accordingly, a computational speed can be increased. Furthermore, scheduling may be performed in such as manner that when the transfer rate of a specific one of connected cycle component eNBs is first fixed and calculated, transfer rates are performed in parallel with respect to several combinations of the MCS, PMI and RI which may be provided by a corresponding eNB and the MCS, PMI and RI for a UE that maximizes network throughput from among the results may be determined.

Figure 11:
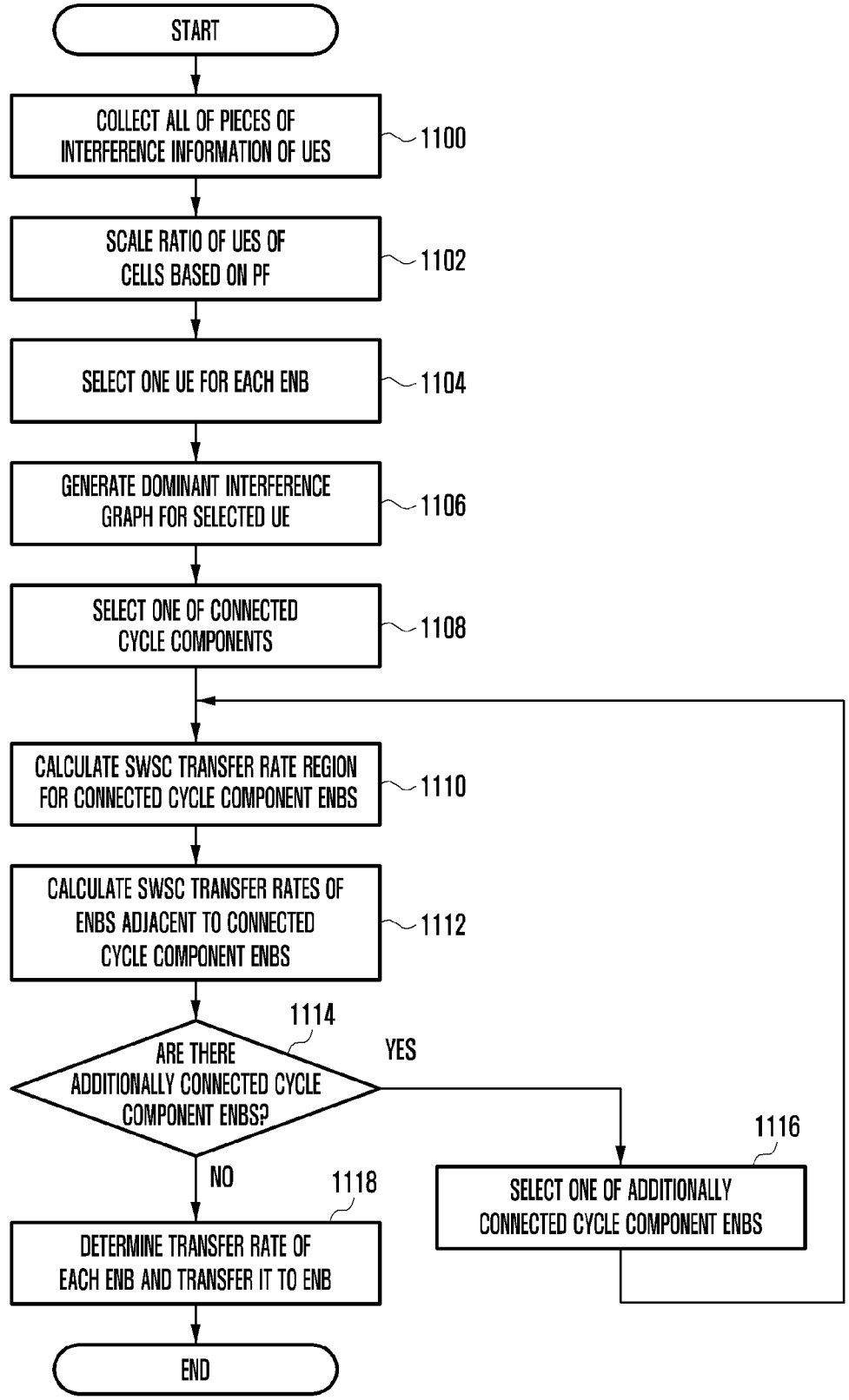
FIG. 11 is a control flowchart for scheduling the transfer rate of each eNB in the centralized device according to the present disclosure.

FIG. 11 is a control flowchart for scheduling the transfer rate of each eNB in the centralized device according to the present disclosure.

At operation 1100, the controller 710 of the centralized device may collect all of pieces of interference information of UEs. This operation may correspond to the operation of collecting information each eNB as described above. For example, a specific eNB may obtain interference information from UEs that belong to UEs located within its own cell and that perform communication in a cell edge, and may transfer the obtained information to the centralized device through a specific interface. Accordingly, at operation 1100, the controller 710 of the centralized device may collect all of the pieces of interference information of all of the UEs that perform communication in the edges of the cells from the eNBs through the eNB interface 701. The information collected as described above may be stored in the memory 720.

Furthermore, at operation 1102, the controller 710 of the centralized device may scale the ratio of UEs in cells based on proportional fairness (PF). Operation 1102 may be included or may not be included, if necessary. In this case, scaling the ratio of the UEs in the cells based on the PF may include adjusting the ratio of UEs selected in the cells by taking into consideration the entire PF included in SWSC scheduling.

Thereafter, at operation 1104, the controller 710 of the centralized device may select one UE for each eNB. In this case, one UE selected for each eNB (cell) in the controller 710 of the centralized device may be a UE having sum PF for each eNB (cell) and/or having a maximum transfer rate sum if the SWSC scheme is used. A case where one UE is selected for each eNB (cell) as described above may correspond to the form of FIG. 9A.

After one UE is selected for each eNB (cell), at operation 1106, the controller 710 of the centralized device may generate a dominant interference graph using the selected UEs. The dominant interference graph may be generated as a graph, such as the graph of FIG. 9B. Accordingly, the dominant interference graph may include at least one connected cycle component. A generated dominant interference graph may not include any connected cycle component. In general, the dominant interference graph may include at least one connected cycle component.

After selecting one of the connected cycle components at operation 1108, the centralized device may proceed to operation 1110 and calculate an SWSC transfer rate region for the connected cycle component eNBs. This operation may correspond to the operation of calculating a transfer rate region between a selected eNB and an eNB that provides dominant interference to the selected eNB or to which the selected eNB provides dominant interference as in FIG. 3. In the present disclosure, an operation for a selected component to select a transfer rate graph with an eNB that provides dominant interference has been first described, but a transfer rate graph with an eNB to which dominant interference may be first selected.

Thereafter, at operation 1112, the controller 710 of the centralized device may calculate the transfer rate of each of the eNBs, that is, each of the connected cycle components in the dominant interference graph. This may be calculated using a method, such as that of FIGS. 10A to 10C. This is described in brief. After one of the connected cycle components is selected, the transfer rate of a signal operating as an interference signal from a dominant interference eNB adjacent to the selected eNB may be set as a specific value, and then its own transfer rate may be determined. After the transfer rate is determined as described above, the transfer rates of the connected cycle components may be sequentially determined one by one. Thereafter, the transfer rates of the connected cycle components may be finally determined by determining the transfer rate of the dominant interference eNB for the first set component within an SWSC graph.

Thereafter, at operation 1112, the centralized device may sequentially calculate the transfer rates of components adjacent to the connected cycle component eNBs. This is described again by taking the case of FIG. 9B as an example. At operation 1108, the controller 710 of the centralized device may select the component of the third eNB 630, may determine the transfer rates of the second eNB 620 and the fourth eNB 640 that are connected cycle components, and may then determine the transfer rate of the first eNB 610 that receive dominant interference from the second eNB 620. Furthermore, the centralized device may determine the transfer rate of the sixth eNB 660 that receives dominant interference from the fourth eNB 640, and may then determine the transfer rate of the fifth eNB 650.

In this case, if necessary, the operation of determining the transfer rate of the first eNB 610 and the operation of determining the transfer rates of the sixth eNB 660 and the fifth eNB 650 may be processed in parallel in the computation unit 711.

FIG. 11 illustrates only a case where connected cycle components are present. If any connected cycle component is not present in a dominant interference graph, a specific one component (eNB) may be selected at both ends. Thereafter, a transfer rate graph according to the SWSC scheme may be obtained from a dominant interference graph for one eNB at both ends. The transfer rates of adjacent components that provide dominant interference or that receive dominant interference may be sequentially determined based on the transfer rate graph.

In another method, if any connected cycle component is not present, SWSC PF may be calculated and a pair having the highest PF may be selected (i.e., a UE may be determined). As described above, one pair is determined, the determined pair becomes a reference point, and the transfer rate may be determined based on the SWSC transfer rate graph as in the aforementioned method.

Operation 1108 to operation 1112 may be performed in parallel. If operation 1108 to operation 1112 are not performed in parallel, operation 1114 may be performed. For example, in the case where operation 1108 to operation 1112 are performed in parallel, from FIG. 9B, it may be seen that two configurations of connected cycle components are present. First, the illustrated third eNB 630, second eNB 620 and fourth eNB 640 may correspond to one configuration of connected cycle components, and the seventh eNB 670 and the eighth eNB 680 may correspond to the other configuration of connected cycle components.

Accordingly, if the configurations of connected cycle components are calculated in parallel, the two configurations of the connected cycle components may be configured to be computed in parallel. FIG. 11 shows an example in which computation is not performed in parallel.

Accordingly, at operation 1114, the controller 710 of the centralized device may check whether another configuration of connected cycle components is present. If another configuration of connected cycle components is present, at operation 1116, the controller 710 of the centralized device may select one component, that is, one eNB, in another configuration of the connected cycle components, may proceed to operation 1110, and may perform computation using the same method as the aforementioned method.

When the computation of the configurations of all of the connected cycle components is computed as described above, the transfer rates of all of the eNBs controlled by the controller 710 of the centralized device are determined. Accordingly, the controller 710 of the centralized device may proceed to operation 1118 and transfer the determined transfer rate to each eNB. Each eNB may apply the SWSC scheme so that a UE located in a cell edge has a maximum transfer rate based on the determined transfer rate.

Furthermore, the embodiments disclosed in this specification and drawings propose only specific examples in order to easily describe the contents of the present disclosure and help understanding, and the embodiments are not intended to restrict the range of right of the present disclosure. Accordingly, it should be understood that all modifications or variations derived based on the technological spirit of the present disclosure in addition to the disclosed embodiments should be construed as being included in the present disclosure.

The present disclosure can be used for performing scheduling for transmitting and receiving data in a wireless communication system using a sliding window superposition coding (SWSC) scheme.

The invention claimed is:

1. A scheduling method for data transmission and reception in a centralized device of a wireless communication system using a sliding window superposition coding (SWSC) scheme, the scheduling method comprising:
   receiving, from a plurality of cells, interference information of user equipments (UEs) included in the plurality of cells;
   selecting one UE for each of the plurality of cells, each selected UE having one of a greatest sum of proportional fairness (sum PF) or a greatest sum of transfer rates in its respective cell;
   generating a dominant interference graph using dominant interference cell information using the selected UEs;
   identifying whether at least one connected cycle component group is present in the generated dominant interference graph;
   selecting one connected cycle component group in response to at least one connected cycle component group being present and selecting a specific component cell from the selected connected cycle component group;
   setting a transfer rate of a component cell providing dominant interference to the selected specific component cell to be a specific transfer rate based on a transfer rate graph of the SWSC scheme;
   determining a transfer rate of the selected specific component cell based on the specific transfer rate;
   determining a transfer rate of a cell belonging to the selected connected cycle component group and having a non-determined transfer rate based on the transfer rate of the selected specific component cell;
   correcting the transfer rate of the component cell providing dominant interference to the selected specific component cell based on the determined transfer rate of the cell belonging to the selected connected cycle component group;
   determining transfer rates of a plurality of cells neighboring the selected connected cycle component group; and
   providing each of the plurality of cells with information about its respective transfer rate determined for that cell.

2. The scheduling method of claim 1, wherein:
   the transfer rates of each cell are calculated using combinations of a modulation and coding scheme (MCS), a precoding index (PMI) and a rank index (RI) selectable with respect to each selected UE, and
   the scheduling method further comprising determining a maximum transfer rate for each of the plurality of cells according to a combination of an MCS, PMI and RI.

3. The scheduling method of claim 2, wherein when transfer rates for the combinations of the MCS, PMI and RI selectable with respect to each selected UE are calculated, the combinations are computed in parallel.

4. The scheduling method of claim 1, further comprising calculating transfer rates of cells included in two or more connected cycle component groups in parallel for each connected cycle component group if the two or more connected cycle component groups are present.

5. The scheduling method of claim 1, further comprising:
   selecting the specific component cell from component cells at both ends of the generated dominant interference graph if a connected cycle component group is not present in the generated dominant interference graph; and
   sequentially calculating transfer rates between the selected specific component cell and component cells having a dominant interference relation with the selected specific component cell based on the transfer rate graph of the SWSC scheme.

6. The scheduling method of claim 1, further comprising:
   calculating SWSC PF for each component cell if a connected cycle component group is not present in the generated dominant interference graph;
   selecting one cell pair having a highest SWSC PF of the SWSC PFs calculated for the component cells;
   determining a transfer rate of each cell of the selected cell pair; and
   sequentially determining transfer rates of neighboring cells based on the determined transfer rate of each of the cells of the selected cell pair.

7. The scheduling method of claim 1, wherein each selected UE is a UE located in a cell edge of its respective cell.

8. A centralized device for scheduling a transfer rate to be transmitted from a plurality of cells using a sliding window superposition coding (SWSC) scheme to a user equipment (UE) located in each cell, the centralized device comprising:

an interface configured to receive, from the plurality of cells, interference information of UEs included in the plurality of cells and to provide scheduling information to each of the plurality of cells;

memory configured to store a previous transfer rate provided to each of the plurality of cells and the interference information of the UEs received from the plurality of cells; and a processor configured to:
- receive, from the plurality of cells, interference information of UEs included in the plurality of cells,
- select one UE for each of the plurality of cells, each selected UE having one of a greatest sum of proportional fairness (sum PF) or a greatest sum of transfer rates in its respective cell,
- generate a dominant interference graph using dominant interference cell information using the selected UEs,
- identify whether at least one connected cycle component group is present in the generated dominant interference graph,
- select one connected cycle component group in response to at least one connected cycle component group being present and select a specific component cell from the selected connected cycle component group,
- set a transfer rate of a component cell providing dominant interference to the selected specific component cell to be a specific transfer rate based on a transfer rate graph of the SWSC scheme,
- determine a transfer rate of the selected specific component cell based on the specific transfer rate,
- determine a transfer rate of a cell belonging to the selected connected cycle component group and having a non-determined transfer rate based on the transfer rate of the selected specific component cell,
- correct the transfer rate of the component cell providing dominant interference to the selected specific component cell based on the determined transfer rate of the cell belonging to the selected connected cycle component group,
- determine transfer rates of a plurality of cells neighboring the selected connected cycle component group, and
- provide each of the plurality of cells with information about its respective transfer rate determined for that cell.

9. The centralized device of claim 8, wherein the processor is configured to:
- calculate the transfer rates of each cell using combinations of a modulation and coding scheme (MCS), a precoding index (PMI) and a rank index (RI) selectable with respect to each selected UE, and
- determine a maximum transfer rate for each of the plurality of cells according to a combination of an MCS, PMI and RI.

10. The centralized device of claim 9, wherein the processor is configured to compute the combinations of the MCS, PMI and RI selectable with respect to each selected UE in parallel when calculating transfer rates for the combinations.

11. The centralized device of claim 8, wherein the processor is configured to calculate transfer rates of cells included in two or more connected cycle component groups in parallel for each connected cycle component group if the two or more connected cycle component groups are present.

12. The centralized device of claim 8, wherein the processor is configured to:
- select the specific component cell from component cells at both ends of the generated dominant interference graph if a connected cycle component group is not present in the generated dominant interference graph, and
- sequentially calculate transfer rates between the selected specific component cell and component cells having a dominant interference relation with the selected specific component cell based on the transfer rate graph of the SWSC scheme.

13. The centralized device of claim 8, wherein the processor is configured to:
- calculate SWSC PF for each component cell if a connected cycle component group is not present in the generated dominant interference graph,
- select one cell pair having a highest SWSC PF of the SWSC PFs calculated for the component cells,
- determine a transfer rate of each cell of the selected cell pair, and
- sequentially determine transfer rates of neighboring cells based on the determined transfer rate of each of the cells of the selected cell pair.

14. The centralized device of claim 8, wherein each selected UE is a UE located in a cell edge of its respective cell.

* * * * *